(12) United States Patent
Yamasaki et al.

(10) Patent No.: US 8,134,907 B2
(45) Date of Patent: Mar. 13, 2012

(54) OPTICAL HEAD, OPTICAL ELEMENT WITH DIFFRACTION GRATING, OPTICAL DISC DEVICE AND INFORMATION PROCESSING DEVICE

(75) Inventors: Fumitomo Yamasaki, Nara (JP); Yoshiaki Komma, Osaka (JP); Tomoaki Tojo, Hyogo (JP)

(73) Assignee: Panasonic Corporation, Osaka (JP)

( * ) Notice: Subject to any disclaimer, the term of this patent is extended or adjusted under 35 U.S.C. 154(b) by 7 days.

(21) Appl. No.: 12/739,245

(22) PCT Filed: Aug. 11, 2009

(86) PCT No.: PCT/JP2009/003849
§ 371 (c)(1),
(2), (4) Date: Apr. 22, 2010

(87) PCT Pub. No.: WO2010/023831
PCT Pub. Date: Mar. 4, 2010

(65) Prior Publication Data
US 2010/0271925 A1    Oct. 28, 2010

(30) Foreign Application Priority Data
Aug. 25, 2008 (JP) ................... 2008-215896

(51) Int. Cl.
*G11B 7/00* (2006.01)
(52) U.S. Cl. ............. 369/112.03; 369/112.04; 369/44.37
(58) Field of Classification Search ............... 369/44.23, 369/44.37, 44.41, 53.19, 112.01, 112.03, 369/112.04; 359/566, 332; 356/632, 499; 360/51
See application file for complete search history.

(56) References Cited

U.S. PATENT DOCUMENTS

| 5,301,059 | A | * | 4/1994 | Kitaoka et al. ................ 359/332 |
| 5,481,515 | A | * | 1/1996 | Kando et al. ............... 369/44.12 |
| 5,502,466 | A | * | 3/1996 | Kato et al. ................... 356/499 |
| 5,640,380 | A |   | 6/1997 | Saimi et al. |

(Continued)

FOREIGN PATENT DOCUMENTS
JP        8-102080        4/1996
(Continued)

OTHER PUBLICATIONS

Abbas Zarifkar et al., "A New Binary Multi-Layer Diffraction Grating", IJCSNS International Journal Computer Science and Network Security, vol. 8, No. 6, Jun. 2008, pp. 262-265.*

(Continued)

*Primary Examiner* — Thuy Pardo
(74) *Attorney, Agent, or Firm* — Wenderoth, Lind & Ponack, L.L.P.

(57) ABSTRACT

An optical head includes a blue-violet laser light source for emitting a blue-violet laser beam, a mirror with a diffraction grating for transmitting and reflecting the blue-violet laser beam at a predetermined ratio, and a front monitor sensor for receiving transmitted light or reflected light from the mirror with a diffraction grating and creating an APC signal for controlling an output of the blue-violet laser light source. The mirror with a diffraction grating includes a first surface which the blue-violet laser beam enters, and a second surface facing the first surface. The first surface and the second surface are mutually parallel. A reflecting coat for transmitting and reflecting the blue-violet laser beam at a predetermined ratio is formed on the first surface, and a diffraction grating is formed on the second surface.

27 Claims, 19 Drawing Sheets

U.S. PATENT DOCUMENTS

| | | | |
|---|---|---|---|
| 5,909,333 | A * | 6/1999 | Best et al. ........................ 360/51 |
| 6,798,727 | B2 | 9/2004 | Motegi et al. |
| 7,251,209 | B2 | 7/2007 | Cho et al. |
| 7,420,691 | B2 * | 9/2008 | Fukui ............................ 356/632 |
| 7,508,746 | B2 | 3/2009 | Negishi et al. |
| 7,577,076 | B2 * | 8/2009 | Ogata et al. ............... 369/112.03 |
| 7,672,201 | B2 * | 3/2010 | Shibuya et al. ............ 369/44.41 |
| 2002/0036972 | A1 | 3/2002 | Motegi et al. |
| 2003/0202453 | A1 | 10/2003 | Cho et al. |
| 2004/0213109 | A1 * | 10/2004 | Ogata et al. ................. 369/53.19 |
| 2006/0028935 | A1 * | 2/2006 | Mori et al. .................. 369/44.37 |
| 2006/0062101 | A1 | 3/2006 | Negishi et al. |
| 2006/0274417 | A1 * | 12/2006 | Kanazawa et al. ............ 359/566 |
| 2006/0285473 | A1 | 12/2006 | Kan |
| 2007/0153298 | A1 * | 7/2007 | Fukui ............................ 356/632 |
| 2008/0037399 | A1 * | 2/2008 | Takahashi et al. ........ 369/112.01 |
| 2008/0159091 | A1 * | 7/2008 | Nakata et al. .............. 369/44.23 |

FOREIGN PATENT DOCUMENTS

| | | |
|---|---|---|
| JP | 11-259906 | 9/1999 |
| JP | 2002-100068 | 4/2002 |
| JP | 2004-5944 | 1/2004 |
| JP | 2006-99933 | 4/2006 |
| JP | 2007-328895 | 12/2007 |
| JP | 2009-199672 | 9/2009 |
| JP | 2009-259347 | 11/2009 |

OTHER PUBLICATIONS

International Search Report issued Nov. 17, 2009 in International (PCT) Application No. PCT/JP2009/003849.

* cited by examiner

OPTICAL HEAD, OPTICAL ELEMENT WITH DIFFRACTION GRATING, OPTICAL DISC DEVICE AND INFORMATION PROCESSING DEVICE

BACKGROUND OF THE INVENTION

1. Technical Field

The present invention relates to an optical head for recording or reproducing information to or from an information recording medium such as an optical disc, an optical disc device comprising such an optical head, an information processing device comprising such an optical disc device, and an optical element with a diffraction grating for guiding a laser beam to a photodetector that creates an automatic power control signal for controlling an output of a light source.

2. Background Art

An optical head for recording or reproducing information to or from an information recording medium such as an optical disc comprises a front monitor sensor for detecting a part of the laser beam that is emitted from the light source in order to more accurately control the output of the laser beam that is emitted from the light source particularly during the recording process. The detection signal in the front monitor sensor is an APC (Automatic Power Control) signal. The APC signal is fed back to the control unit for controlling the output of the light source. The APC signal is used for controlling the output of the light source so that appropriate power that is required for the recording and/or reproduction of the information can be obtained.

Nevertheless, if the laser beam that is emitted from the light source is converted into parallel light with, for instance, a collimator lens or the like, the optical axis of the laser beam that is headed toward the front monitor sensor after passing through or being reflected by the planar beam splitter or the planar reflective mirror and the optical axis of the laser beam that is headed toward the front monitor sensor after being internally reflected by the planar beam splitter or the planar reflective mirror will mutually become parallel and cause interference. Consequently, the APC signal in the front monitor sensor will no longer be accurately proportionate to the output of the light source.

FIG. 17 is a diagram showing the condition of transmitted light and reflected light in a conventional planar beam splitter. For example, as shown in FIG. 17, parallel light P1 that is emitted from within the effective region of the collimator lens enters a planar beam splitter 105. Here, the parallel light P1 is split into reflected light R that was reflected by a first surface 105a and transmitted light T1 that passed through the first surface 105a and a second surface 105b and is headed toward the front monitor sensor. Here, parallel light P2 that was emitted from within a different effective region of the collimator lens passes through the first surface 105a, and is subsequently reflected by the second surface 105b. Further, the parallel light P2 that was reflected by the second surface 105b is reflected by the first surface 105a, subsequently passes through the second surface 105b, and is emitted as the transmitted light T2.

Here, if the optical axis of the parallel light P1 and the optical axis of the parallel light P2 are mutually parallel, and the first surface 105a and the second surface 105b of the planar beam splitter 105 are mutually parallel, the optical axis of the transmitted light T1 and the optical axis of the transmitted light T2 will become mutually parallel, and cause an interference in the effective region of the front monitor sensor. Thus, even if the output of the light source is changed linearly, the APC signal that was detected with the front monitor sensor and converted into an electrical signal will not change linearly.

As described above, in an optical configuration where parallel light is caused to enter the planar beam splitter or the planar reflective mirror in which the light incident plane and the light emission plane are parallel, it will become difficult to accurately control the output of the light source.

Thus, Patent Literature 1 describes an optical pickup for inhibiting the interference of the laser beam caused by the internal reflection with the planar beam splitter by adopting an optical configuration in which converging light or diverging light enters the planar beam splitter. In addition, Patent Literature 1 describes an optical pickup for inhibiting the interference of the laser beam caused by the internal reflection with the beam splitter by using a wedge-shaped beam splitter.

The conventional optical pickup described in Patent Literature 1 is now explained with reference to FIG. 18. FIG. 18 is a diagram showing a schematic configuration of a conventional optical pickup.

In FIG. 18, an optical pickup 150 is configured from first and second light sources 110, 120 for emitting light respectively having different wavelengths, a planar beam splitter 125, first and second collimator lenses 114, 124 disposed between the first and second light sources 110, 120 and the planar beam splitter 125, a front monitor sensor 126, a mirror 127 and an objective lens 129.

In the conventional optical pickup 150, the front monitor sensor 126 is used for detecting an APC signal. In the foregoing case, the first collimator lens 114 is disposed so as to convert the laser beam that is emitted as diverging light from the first light source 110 into converging light or diverging light. Specifically, the first collimator lens 114 is disposed in a state of being moved to a position that is closer to the first light source 110 or to a position that is farther away from the first light source 110 than a position of changing the laser beam that is emitted from the first light source 110 to parallel light.

For example, a case of converting the laser beam that is emitted from the first light source 110 into diverging light with the first collimator lens 114 is now explained with reference to FIG. 19. FIG. 19 is a diagram showing the condition of the transmitted light and the reflected light in the planar beam splitter of the conventional optical pickup shown in FIG. 18.

In FIG. 19, the planar beam splitter 125 includes a first surface 125a which the laser beam that was emitted from the first light source 110 enters, and a second surface 125b facing the first surface 125a. Diverging light Q3 that was emitted from the effective region of the first collimator lens 114 enters the planar beam splitter 125. Here, the diverging light Q3 is split into reflected light R that was reflected by the first surface 125a and transmitted light T3 that passed through the first surface 125a and the second surface 125b and is headed toward the front monitor sensor 126. Here, diverging light Q4 that was emitted within a different effective region of the first collimator lens 114 will be reflected by the second surface 125b after passing through the first surface 125a. In addition, the diverging light Q4 that was reflected by the second surface 125b is reflected by the first surface 125a, subsequently passes through the second surface 125b, and is emitted as transmitted light T4.

Here, since the diverging light Q3 and the diverging light Q4 are emitted from different effective regions of the first collimator lens 114, the optical axis of the diverging light Q3 and the optical axis of the diverging light Q4 will not be parallel. Accordingly, even if the first surface 125a and the second surface 125b of the planar beam splitter 125 are mutually parallel, the optical axis of the transmitted light T3 and the optical axis of the transmitted light T4 will not be parallel.

As described above, as a result of the collimator lens 114 being disposed so that the space between the first light source 110 and the first collimator lens 114 will be shorter than the focal length of the first collimator lens 114, the laser beam that is headed toward the planar beam splitter 125 will become diverging light, and the front monitor sensor 126 and is disposed to receive the laser beam that is emitted from the first light source 110. Here, the optical axis of the laser beam that passed through the planar beam splitter 125 and is headed toward the front monitor sensor 126 and the optical axis of the laser beam that was internally reflected two or more times in the planar beam splitter 125 and is subsequently headed toward the front monitor sensor 126 will not be mutually parallel. Accordingly, it is possible to inhibit the interference of the laser beam in the effective region of the front monitor sensor 126.

With this kind of conventional optical pickup, the front monitor sensor 126 is able to create an APC signal that is accurately proportionate to the quantity of light of the first light source 110. If this APC signal is fed back to the control unit that is controlling the first light source 110 in order to control the output of the first light source 110, the laser beam can be emitted with a recording power possessing linearity. Thus, upon recording information on an optical disc, the first light source 110 can be accurately controlled so that the laser beam to be emitted will have the intended recording power.

Meanwhile, the second collimator lens 124 is disposed so as to convert the laser beam that is emitted as diverging light from the second light source 120 into diverging light or converging light. Thus, the front monitor sensor 126 is also able to accurately control the second light source 120 so that the laser beam to be emitted will have the intended recording power.

The conventional optical pickup comprising the wedge-shaped beam splitter described in Patent Literature 1 is now explained. The optical pickup comprising the wedge-shaped beam splitter is characterized in comprising a wedge-shaped beam splitter 145 in substitute for the planar beam splitter 125 of the optical pickup 150 shown in FIG. 18.

FIG. 20 is a diagram showing the condition of the transmitted light and the reflected light in the wedge-shaped beam splitter of a conventional optical pickup. With the wedge-shaped beam splitter 145, as shown in FIG. 20, the first surface 145a and the second surface 145b mutually form a predetermined angle. The first collimator lens 114 and/or second collimator lens 124 is disposed so as to converge the laser beam that is emitted as diverging light from the first light source 110 and the second light source 120 into parallel light. With the wedge-shaped beam splitter 145, the angle formed by the first surface 145a and the second surface 145b is decided so that interference will not occur in the effective region of the front monitor sensor 126 due to the internal reflection occurring two or more times.

In FIG. 20, parallel light P5 that is emitted from within the effective region of the first collimator lens 114 enters the wedge-shaped beam splitter 145. Here, the parallel light P5 is split into reflected light R that was reflected by the first surface 145a and transmitted light T5 that passed through the first surface 145a and the second surface 145b and is headed toward the front monitor sensor 126. Parallel light P6 that was emitted from within a different effective region of the first collimator lens 114 is reflected by the second surface 145b after passing through the first surface 145a. In addition, the parallel light P6 that was reflected by the second surface 145b is reflected by the first surface 145a, subsequently passes through the second surface 145b, and is emitted as transmitted light T6.

Here, although the optical axis of the parallel light P5 and the optical axis of the parallel light P6 are mutually parallel, since the first surface 145a and the second surface 145b of the wedge-shaped beam splitter 145 are forming a predetermined angle, the optical axis of the transmitted light T5 and the optical axis of the transmitted light T6 will not be parallel.

As described above, as a result of using the wedge-shaped beam splitter 145 in which the light incident plane and the light emission plane form a predetermined angle, the laser beam that is emitted from the first light source 110, passes through the wedge-shaped beam splitter 145, and is subsequently headed toward the front monitor sensor 126 and the laser beam that is headed toward the front monitor sensor 126 after being internally reflected at least two or more times in the wedge-shaped beam splitter 145 will not be mutually parallel. Accordingly, it is possible to inhibit the interference of the laser beam in the effective region of the front monitor sensor 126 and create an APC signal that is accurately proportionate to the quantity of light of the first light source 110, and accurately control the optical output of the first light source 110.

Moreover, as a result of using the wedge-shaped beam splitter 145, the laser beam that is emitted from the second light source 120, internally reflected once in the wedge-shaped beam splitter 145 and is subsequently headed toward the front monitor sensor 126 and the laser beam that is headed toward the front monitor sensor 126 after being internally reflected at least three or more times in the wedge-shaped beam splitter 145 will not be mutually parallel. Accordingly, it is possible to inhibit the interference of the laser beam in the effective region of the front monitor sensor 126 and create an APC signal that is accurately proportionate to the quantity of light of the second light source 120, and accurately control the optical output of the second light source 120.

Meanwhile, pursuant to the practical application of a blue-violet semiconductor laser, a Blu-ray Disc (hereinafter referred to as "BD") as a high density, large capacity optical information recording medium (hereinafter also referred as an "optical disc") of the same size as a CD (Compact Disc) and a DVD (Digital Versatile Disc) has been put into practical use. The BD is an optical disc that uses a blue-violet laser light source for emitting blue-violet light having a wavelength of approximately 400 nm and an objective lens having a numerical aperture (Numerical Aperture: NA) that is approximately 0.85 and records or reproduces information to or from the information recording surface in which the thickness of the light transmitting layer is approximately 0.1 mm.

With a high density optical disc such as a BD, information will be recorded or reproduced to or from a plurality of information recording surfaces. However, since the thickness of the light transmitting layer for each information recording surface is different, third order spherical aberration will occur in accordance with the distance from the optimal light transmitting layer thickness to the information recording surface on the information recording surface that deviates from the optimal light transmitting layer thickness of the objective lens. Incidentally, the optimal light transmitting layer thickness of the objective lens refers to the thickness of the light transmitting layer in which the third order spherical aberration will be minimal when parallel light enters the objective lens. If the wavelength of the laser beam is 400 nm and the NA of the objective lens is 0.85, third order spherical aberration of approximately 100 mλ will occur for a 10 μm thickness deviation of the light transmitting layer. Thus, an optical head for use in this kind of optical disc generally comprises means for correcting the third order spherical aberration.

For example, Patent Literature 2 describes an optical head in which a collimator lens is mounted on a collimator lens actuator, and, in order to negate the third order spherical aberration caused by the thickness deviation of the light transmitting layer, the collimator lens disposed between a light source and an objective lens is moved in the optical axis direction to change the divergence angle or convergent angle of the laser beam that enters the objective lens.

With a BD, following types of discs have been put into practical use; namely, a single layer disc comprising a single information recording surface in which the thickness of the light transmitting layer is 100 μm, and a dual layer disc comprising two information recording surfaces each having a light transmitting layer with a thickness of 100 μm and 75 μm. With an optical disc comprising a plurality of information recording surfaces, since the thickness of the light transmitting layer will differ for each information recording surface, the collimator lens needs to be moved in a wide range in order to negate the third order spherical aberration caused by the thickness deviation of the light transmitting layer or various errors. Specifically, the laser beam that is emitted from the collimator lens will be used in a broad range of the converging light, the parallel light and the diverging light. Accordingly, with an optical head for recording or reproducing information to or from an optical disc including a plurality of information recording surfaces, it is not possible to adopt a configuration using the conventional planar beam splitter, and there is no choice but to use the wedge-shaped beam splitter that entails high production costs.

Patent Literature 1: Japanese Patent Application Laid-open No. 2004-5944
Patent Literature 2: Japanese Patent Application Laid-open No. H11-259906

SUMMARY OF THE INVENTION

The present invention was devised in order to overcome the foregoing problems, and an object thereof is to provide an optical head, an optical element with a diffraction grating, an optical disc device and an information processing device capable of accurately controlling the laser power of the laser beam that is emitted from the light source.

The optical head according to one aspect of the present invention comprises a first light source for emitting a first laser beam having a first wavelength $\lambda 1$, a first planar optical element for transmitting and reflecting the first laser beam at a predetermined ratio, a first objective lens for converging the first laser beam onto an information recording surface of a first information recording medium, a first photodetector for receiving reflected light from the information recording surface of the first information recording medium and creating an information signal and/or an error signal, and a second photodetector for receiving transmitted light or reflected light from the first planar optical element and creating an automatic power control signal for controlling an output of the first light source, wherein the first planar optical element includes a first surface which the first laser beam emitted from the first light source enters, and a second surface facing the first surface, the first surface and the second surface are mutually parallel, a reflective coat for transmitting and reflecting the first laser beam at a predetermined ratio is formed on the first surface, and a diffraction grating is formed on the second surface.

According to this configuration, the first light source emits a first laser beam having a first wavelength $\lambda 1$, and the first planar optical element transmits and reflects the first laser beam at a predetermined ratio. The first objective lens converges the first laser beam onto an information recording surface of a first information recording medium, and the first photodetector receives reflected light from the information recording surface of the first information recording medium, and creates an information signal and/or an error signal. The second photodetector receives transmitted light or reflected light from the first planar optical element, and creates an automatic power control signal for controlling the output of the first light source. The first planar optical element includes a first surface which the first laser beam emitted from the first light source enters, and a second surface facing the first surface, and the first surface and the second surface are mutually parallel. A reflective coat for transmitting and reflecting the first laser beam at a predetermined ratio is formed on the first surface, and a diffraction grating is formed on the second surface.

According to the present invention, it is possible to inhibit the interference of the laser beam in the effective region of the photodetector for controlling the laser power of the light source, and it is thereby possible to accurately control the laser power of the laser beam that is emitted from the light source.

The object, features and advantages of the present invention will become clearer based on the ensuing detailed explanation and attached drawings.

DETAILED DESCRIPTION OF THE INVENTION

Embodiments of the present invention are now explained with reference to the attached drawings. The following embodiments are merely examples that embody the present invention, and are not intended to limit the technical scope of the present invention in any way.

First Embodiment

Figure 1:
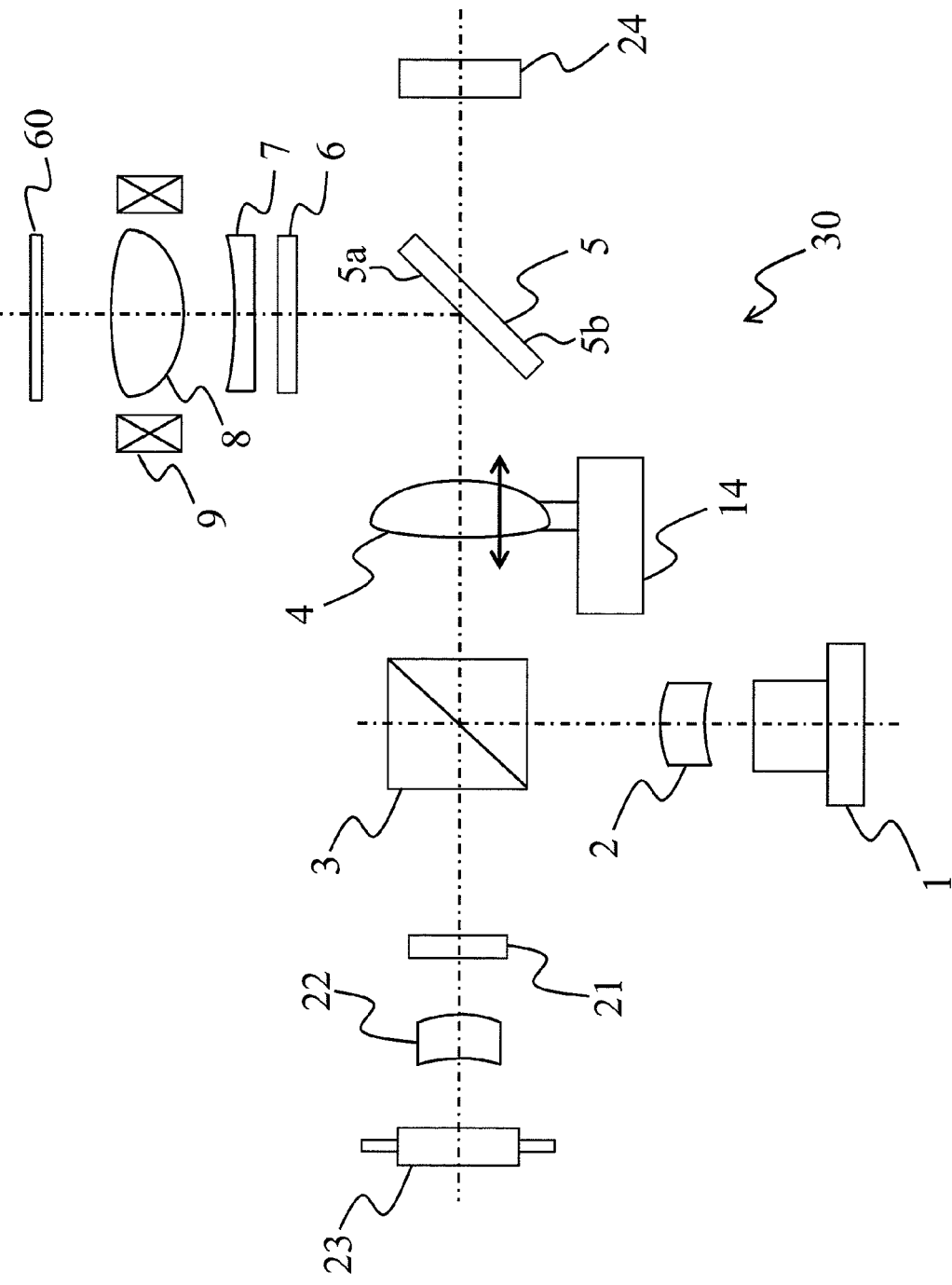
FIG. 1 is a diagram showing the schematic configuration of the optical head in the first embodiment of the present invention.
Figure 2:
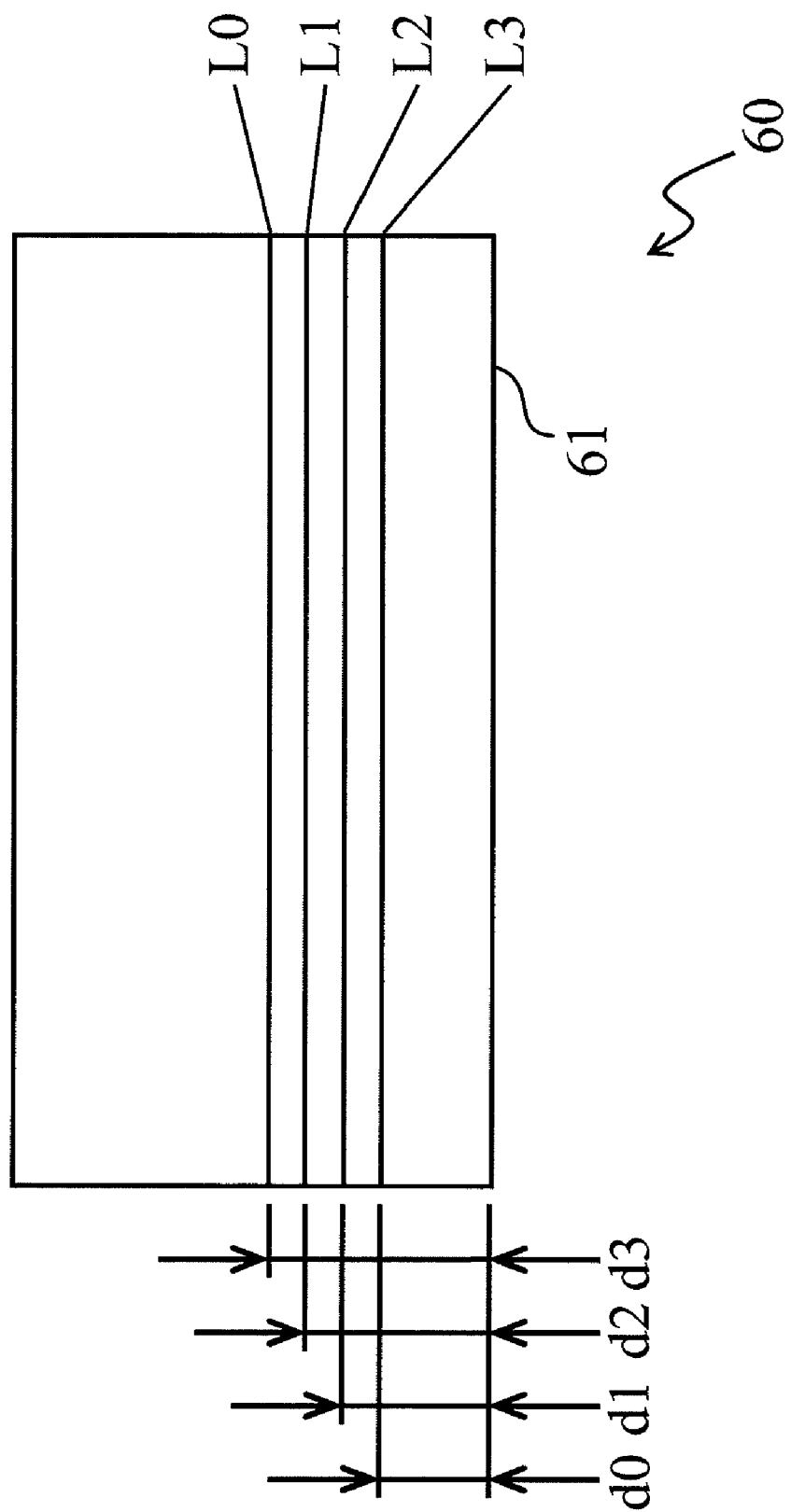
FIG. 2 is a diagram showing the schematic configuration of the multilayer optical disc in the first embodiment of the present invention.

FIG. 1 is a diagram showing the schematic configuration of the optical head in the first embodiment of the present invention. FIG. 2 is a diagram showing the schematic configuration of the multilayer optical disc in the first embodiment of the present invention.

In FIG. 1, an optical head 30 comprises a blue-violet laser light source 1, a relay lens 2, a polarizing beam splitter 3, a collimator lens 4, a mirror with a diffraction grating 5, a quarter wavelength plate 6, a diffraction lens 7, an objective lens 8, an objective lens actuator 9, a collimator lens actuator 14, a detection hologram 21, a detection lens 22, a light receiving element 23 and a front monitor sensor 24.

The multilayer optical disc 60 includes, as shown in FIG. 2, four information recording surfaces L0 to L3. Thickness d3 of the light transmitting layer of the information recording surface L0 is for instance 100 μm, thickness d2 of the light transmitting layer of the information recording surface L1 is for instance 83 μm, thickness d1 of the light transmitting layer of the information recording surface L2 is for instance 69 μm, and thickness d0 of the light transmitting layer of the information recording surface L3 is for instance 55 μm.

Incidentally, the term light transmitting layer as used in this specification represents the layer between the information recording surface and the light incident plane 61. Thus, the thickness of the light transmitting layer of the information recording surface represents the distance from the information recording surface to the light incident plane 61.

Incidentally, if the thickness of the light transmitting layer is increased, third order coma aberration caused by the inclination of the optical disc or the objective lens will increase drastically with a high density optical disc such as a BD having a large NA of the objective lens. Specifically, the third order coma aberration will increase in proportion to the cube of the NA. In other words, with an optical disc having a plurality of information recording surfaces, the maximum value of the thickness of the light transmitting layer is decided based on the NA of the objective lens. Thus, with a multilayer high density optical disc comprising three or more information recording surfaces, there is no choice but to reduce the space of the information recording surfaces to be smaller than the BD and the like which have been put into practical use.

The blue-violet laser light source 1 emits a blue-violet laser beam having a first wavelength $\lambda 1$ (for example, approximately 405 nm). The mirror with a diffraction grating 5 transmits and reflects the blue-violet laser beam at a predetermined ratio. Moreover, the mirror with a diffraction grating 5 reflects the blue-violet laser beam so that it enters substantially perpendicularly the information recording surface of the multilayer optical disc 60.

The objective lens 8 converges the blue-violet laser beam onto the information recording surface of the multilayer optical disc 60. The light receiving element 23 receives the reflected light from the information recording surface of the multilayer optical disc 60, and creates an information signal and/or an error signal. The front monitor sensor 24 receives the transmitted light or the reflected light of the mirror with a diffraction grating 5, and creates an automatic power control signal for controlling the output of the blue-violet laser light source 1.

The collimator lens actuator 14 corrects the spherical aberration that occurs according to the thickness of the light transmitting layer of the multilayer optical disc 60. Specifically, the collimator lens actuator 14 causes diverging light to enter the objective lens 8 upon recording or reproducing information to or from an information recording surface L0 with the thickest light transmitting layer, and causes converging light to enter the objective lens 8 upon recording or reproducing information to or from an information recording surface L3 with the thinnest light transmitting layer.

The operation of the optical head 30 upon recording or reproducing information to or from the multilayer optical disc 60 is now explained. The blue-violet laser beam having a wavelength of approximately 405 nm that was emitted from the blue-violet laser light source 1 is converted into diverging light having a different NA by the relay lens 2, and enters the polarizing beam splitter 3 by S polarization. The blue-violet laser beam that was reflected by the polarizing beam splitter 3 is converted into approximately parallel light with the collimator lens 4, and enters the mirror with a diffraction grating 5. A part of the blue-violet laser beam that entered the mirror with a diffraction grating 5 is reflected in the direction of the quarter wavelength plate 6. The other part of the blue-violet laser beam that entered the mirror with a diffraction grating 5 passes through the mirror with a diffraction grating 5, and subsequently enters the front monitor sensor 24. Then the output of the blue-violet laser light source 1 is controlled based on the output of the front monitor sensor 24.

Meanwhile, the blue-violet laser beam that was reflected by the mirror with a diffraction grating 5 is converted into circular polarized light by the quarter wavelength plate 6, and thereafter passes through the diffraction lens 7. The blue-violet laser beam that passed through the diffraction lens 7 is converged as a light spot onto any one of the information recording surfaces L0 to L3 of the multilayer optical disc 60 by the objective lens 8.

The blue-violet laser beam that is reflected by the predetermined information recording surface of the multilayer optical disc 60 passes through the objective lens 8 and the diffraction lens 7 once again, is converted into linear polarized light that is different from the outward path by the quarter wavelength plate 6, and subsequently reflected by the mirror with a diffraction grating 5. The blue-violet laser beam that is reflected by the mirror with a diffraction grating 5 passes through the collimator lens 4, and enters the polarizing beam splitter 3 by P polarization. The blue-violet laser beam that passed through the polarizing beam splitter 3 is guided to the light receiving element 23 via the detection hologram 21 and the detection lens 22. The blue-violet laser beam that was detected with the light receiving element 23 is subject to photoelectric conversion. The signal created by photoelectric conversion is operated with the control unit described later, and a focus error signal for following the surface fluctuation of the multilayer optical disc 60 and a tracking error signal for following the eccentricity of the multilayer optical disc 60 are created.

Incidentally, in the first embodiment, the blue-violet laser beam corresponds to an example of the first laser beam and the laser beam, the blue-violet laser light source 1 corresponds to an example of the first light source, the mirror with a diffraction grating 5 corresponds to an example of the first planar optical element and the optical element with a diffraction grating, the multilayer optical disc 60 corresponds to an example of the first information recording medium, the objective lens 8 corresponds to an example of the first objective lens, the light receiving element 23 corresponds to an example of the first photodetector, the front monitor sensor 24 corresponds to an example of the second photodetector and the photodetector, and the collimator lens actuator 14 corresponds to an example of the spherical aberration correction unit.

The detection of the focus error signal and the detection of the tracking error signal in the optical head of the first embodiment are now explained.

The focus error signal for following the surface fluctuation of the multilayer optical disc 60 is detected using the so-called astigmatism method or the like of detecting the focal spot provided by the detection lens 22 based on astigmatism with a quartered light receiving pattern in the light receiving element 23.

Meanwhile, the tracking error signal for following the eccentricity of the multilayer optical disc 60 is created by detecting zero order light and ±first order diffracted light which are created upon passing through the detection hologram 21 in a predetermined light receiving area of the light receiving element 23. Consequently, it is possible to inhibit the variation in the tracking error signal that occurs when there is variation in the position, width and depth of the groove of the information track that is formed on the multilayer optical disc 60, and the variation in the tracking error signal that occurs as a result of information being recorded on the information track and the reflectance being changed thereby. It is also possible to avoid unnecessary light (stray light) that is reflected by an information recording surface that is different from the information recording surface to be subject to recording or reproduction from entering the light receiving area in which the tracking error signal is to be detected.

The detection of the focus error signal and the tracking error signal is not limited to the foregoing detection methods and, for example, it is also possible to use a differential push-pull method (DPP method) or the like that uses a main beam and a sub beam that are created by the diffraction grating for detecting the tracking error signal.

Figure 3:
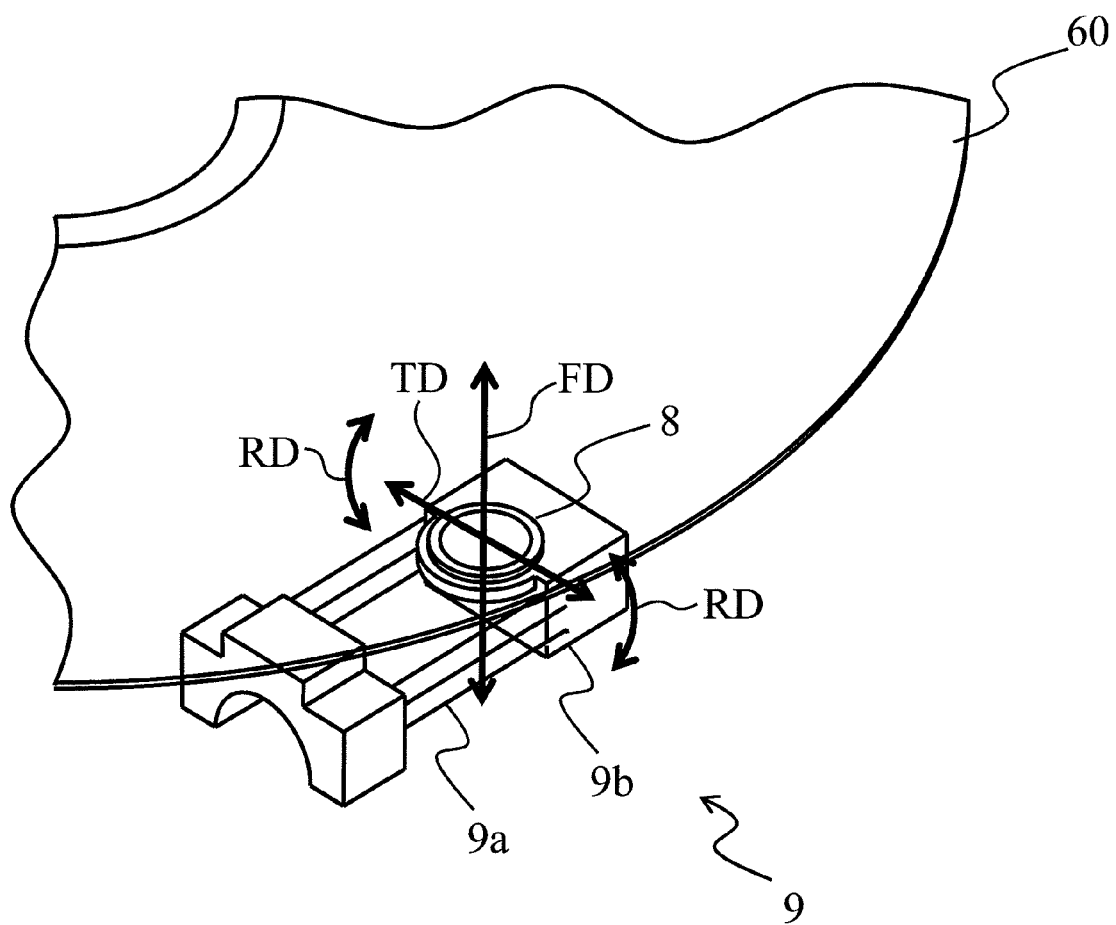
FIG. 3 is a view showing a frame format of the configuration of the objective lens actuator in the first embodiment of the present invention.

The objective lens actuator of this embodiment is now explained. FIG. 3 is a view showing a frame format of the configuration of the objective lens actuator in the first embodiment of the present invention.

The objective lens actuator 9 drives the objective lens 8 in a biaxial direction so that that the light spot will follow the information track of the rotating multilayer optical disc 60 with the focus error signal and the tracking error signal.

As shown in FIG. 3, an objective lens holder 9b (moving part) for retaining the objective lens 8 is supported with a plurality of suspension wires 9a. The objective lens actuator 9 drives the objective lens 8 in the focus direction FD and the tracking direction TD using the focus error signal and the tracking error signal so that the light spot will follow the information track of the rotating multilayer optical disc 60.

In addition to the displacement of the focus direction FD and the tracking direction TD, the objective lens actuator 9 is also able to incline the objective lens 8 in the radial direction RD of the multilayer optical disc 60.

The collimator lens actuator in the first embodiment is now explained. The collimator lens 4 is able to move in the optical axis direction of the collimator lens 4 by the collimator lens actuator 14.

Figure 4:
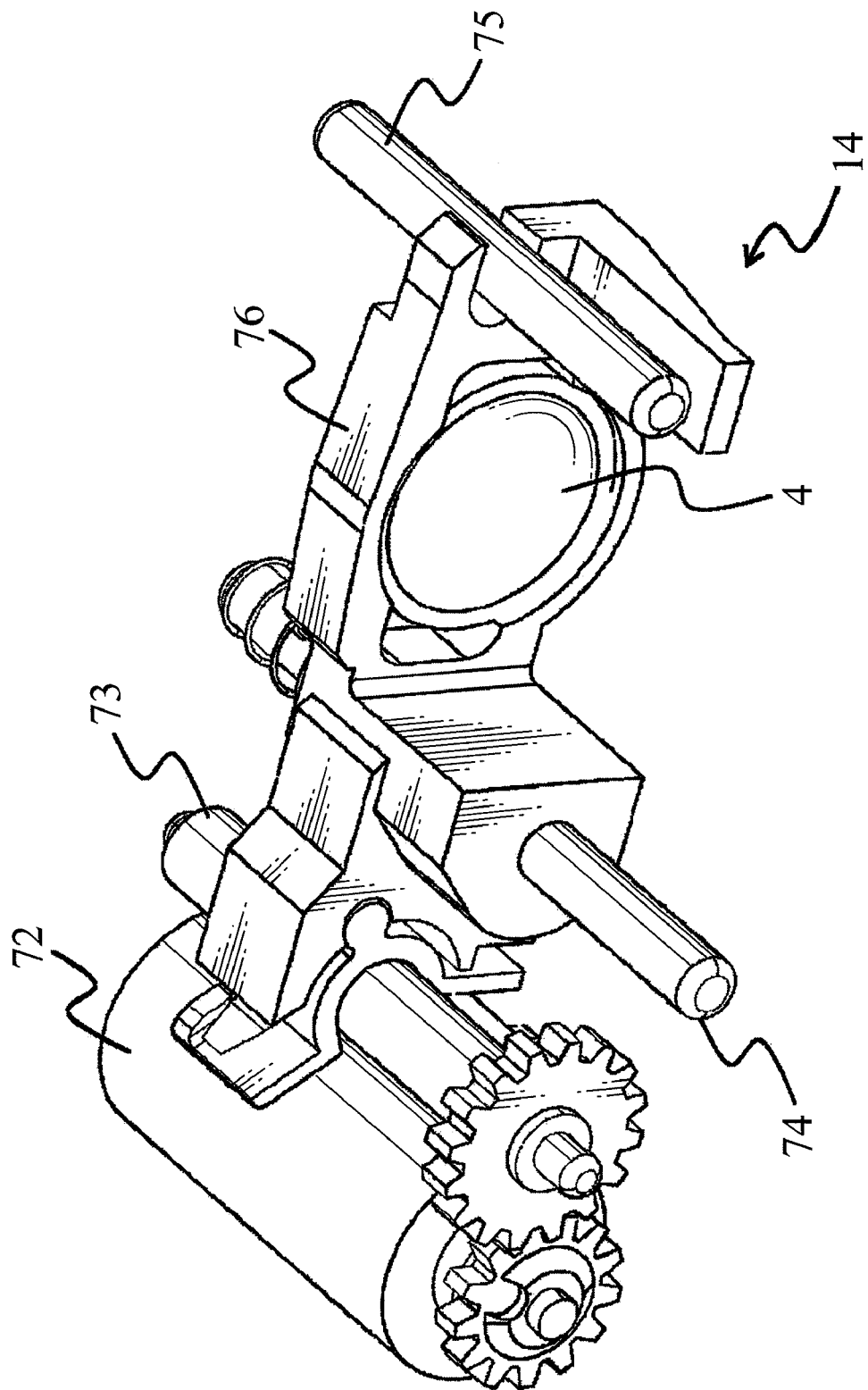
FIG. 4 is a view showing a frame format of the schematic configuration of the collimator lens actuator in the first embodiment of the present invention.

FIG. 4 is a view showing a frame format of the schematic configuration of the collimator lens actuator 14 in the first embodiment of the present invention. In FIG. 4, the collimator lens actuator 14 comprises a stepping motor 72, a screw shaft 73, a principal shaft 74, a secondary shaft 75 and a lens holder 76. As a result of driving the stepping motor 72 and rotating the screw shaft 73, the lens holder 76 holding the collimator lens 4 moves in the optical axis direction of the collimator lens 4 along the principal shaft 74 and the secondary shaft 75.

Figure 5:
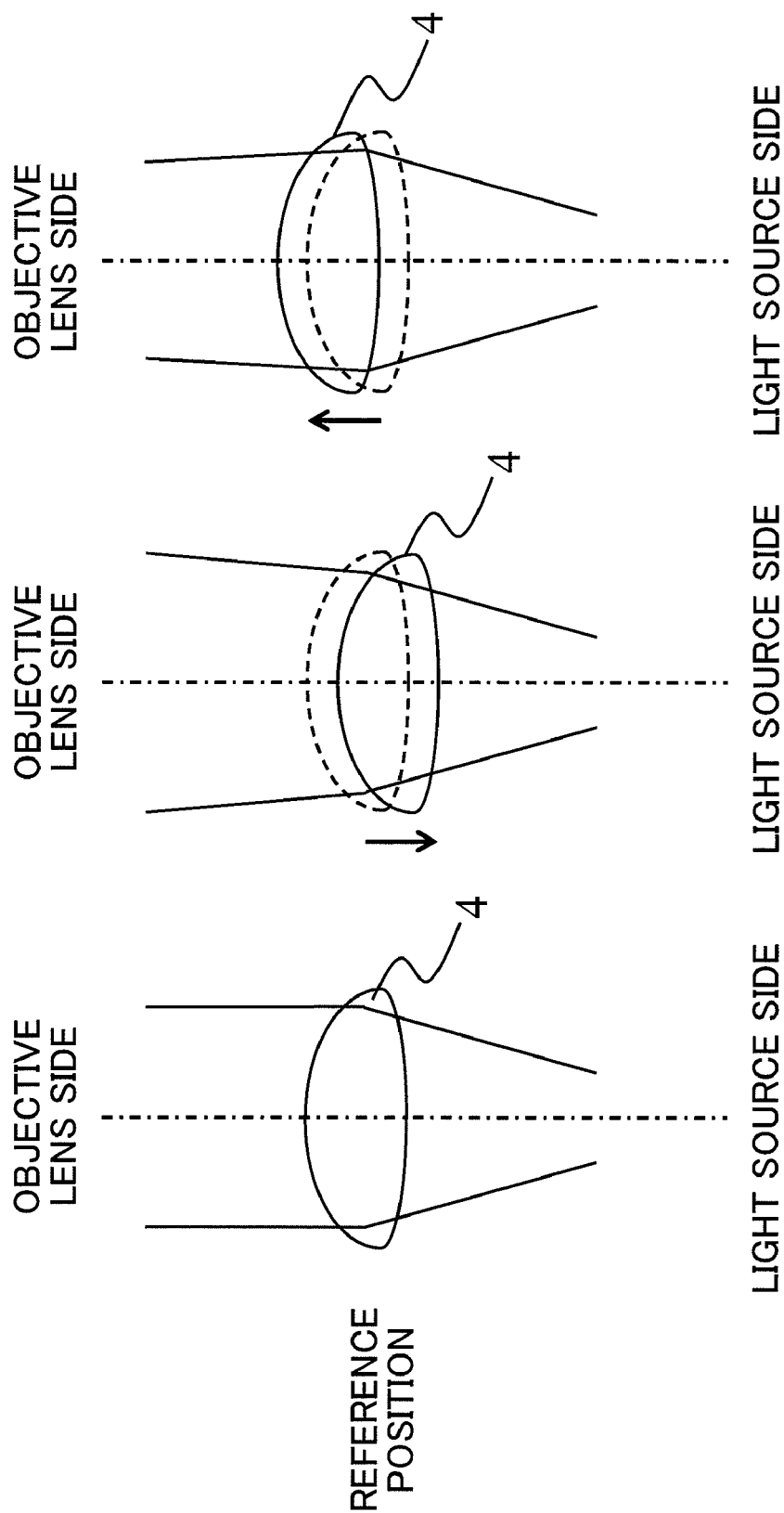
FIG. 5A is a diagram showing the outgoing beam when the collimator lens is in the reference position.
FIG. 5B is a diagram showing the outgoing beam when the collimator lens moves to the light source side.
FIG. 5C is a diagram showing the outgoing beam when the collimator lens moves to the objective lens side.

FIG. 5A is a diagram showing the outgoing beam when the collimator lens is in the reference position, FIG. 5B is a diagram showing the outgoing beam when the collimator lens moves to the light source side, and FIG. 5C is a diagram showing the outgoing beam when the collimator lens moves to the objective lens side.

As shown in FIG. 5A, when the collimator lens 4 is in the reference position, the outgoing beam of the collimator lens 4 will be approximately parallel light. Meanwhile, as shown in FIG. 5B, as a result of moving the collimator lens 4 from the reference position to the light source side, the outgoing beam of the collimator lens 4 becomes diverging light, and it is possible to correct the third order spherical aberration that occurs when the light transmitting layer of the multilayer optical disc 60 becomes thick.

Meanwhile, as shown in FIG. 5C, as a result of moving the collimator lens 4 from the reference position to the objective lens side, the outgoing beam of the collimator lens 4 becomes converging light, and it is possible to correct the third order spherical aberration that occurs when the light transmitting layer of the multilayer optical disc 60 becomes thin. Specifically, in the multilayer optical disc 60 comprising a plurality of information recording surfaces, it is possible to correct the third order spherical aberration by moving the collimator lens 4 according to the thickness of the light transmitting layer of the respective information recording surfaces.

Incidentally, the configuration of the collimator lens actuator 14 for moving the collimator lens 4 in the optical axis direction is not limited to the configuration using the stepping motor 72 as shown in FIG. 4 and, for example, it may also be any configuration such as an actuator that is driven with a magnetic circuit or a piezoelectric element. With the configuration using the stepping motor 72 shown in FIG. 4, the system can be simplified since it is not necessary to monitor the position of the optical axis direction of the collimator lens 4. Meanwhile, since the actuator that is driven with a magnetic circuit or a piezoelectric element has a small drive part, it is suitable for miniaturizing the optical head.

The objective lens of in the first embodiment is now explained. The design conditions of the objective lens 8 in the optical head 30 of the first embodiment are as follows. Specifically, the design wavelength is 405 nm, the design light transmitting layer thickness is 80 μm, the focal length is 1.3 mm, the numerical aperture (NA) is 0.855, and the working distance is 0.3 mm. The design light transmitting layer thickness represents the thickness of the light transmitting layer in which the third order spherical aberration will be minimal when parallel light enters the objective lens.

The objective lens 8 of the first embodiment has a design light transmitting layer thickness of 80 μm. Thus, when collecting light on the information recording surface L0 in which the thickness of the light transmitting layer is 100 μm and the information recording surface L1 in which the thickness of the light transmitting layer is 83 μm, diverging light is caused to enter the objective lens 8 by moving the collimator lens 4 to the light source side. Consequently, it is possible to correct the third order spherical aberration that occurs due to the deviation in the thickness of the light transmitting layer from the design light transmitting layer thickness. Meanwhile, when collecting light on the information recording surface L2 in which the thickness of the light transmitting layer is 69 μm and the information recording surface L3 in which the thickness of the light transmitting layer is 55 μm, converging light is caused to enter the objective lens 8 by moving the collimator lens 4 to the objective lens side. Consequently, it is possible to correct the third order spherical aberration that occurs due to the deviation in the thickness of the light transmitting layer from the design light transmitting layer thickness.

Nevertheless, the variation in the light transmitting layer thickness of the information recording surfaces L0 to L3 is, for example, ±5 μm=50 mλ, the initial aberration of the optical element such as the objective lens is, for example, ±20 mλ, and the third order spherical aberration that occurs due to change in temperature or change in wavelength of the light source is, for example, ±20 mλ. When giving consideration to the variation in the third order spherical aberration, since the third order spherical aberration 10 mλ, in NA=0.855 corresponds to a 1 μm thickness of the light transmitting layer, it is necessary to give consideration to the variation in the third order spherical aberration corresponding to a ±9 μm thickness of the light transmitting layer upon recording or reproducing information to or from the respective information recording surfaces L0 to L3.

Accordingly, the thickness of the light transmitting layer of the information recording surface L0 will be 100±9 μm (91 to 109 μm), the thickness of the light transmitting layer of the information recording surface L1 will be 83±9 μm (74 to 92 μm), the thickness of the light transmitting layer of the information recording surface L2 will be 69±9 μm (60 to 78 μm), and the thickness of the light transmitting layer of the information recording surface L3 will be 55±9 μm (46 to 64 μm).

As described above, the required moving range of the collimator lens 4 in a predetermined information recording surface will overlap with the required moving range of the collimator lens 4 of an adjacent information recording surface. Here, if the amount of the third order spherical aberration corresponds to 80 μm which is equivalent to the design light transmitting layer thickness of the objective lens 8, the laser beam that is emitted from the collimator lens 4 will be parallel light. Accordingly, with the optical head 30 of the first embodiment, the laser beam that is emitted from the collimator lens 4 may become parallel light upon recording or reproducing information to or from the information recording surface L1.

The mirror with a diffraction grating in the first embodiment is now explained.

As shown in FIG. 1, the mirror with a diffraction grating 5 of the first embodiment mainly reflects the blue-violet laser beam that is emitted from the collimator lens 4, and bends the reflected part of the blue-violet laser beam in the direction of the objective lens 8. Moreover, the mirror with a diffraction grating 5 transmits the other part of the blue-violet laser beam, and causes the other transmitted part of the blue-violet laser beam to enter the front monitor sensor 24.

The mirror with a diffraction grating 5 includes a first surface 5a which the blue-violet laser beam that was emitted from the blue-violet laser light source 1 enters, and a second surface 5b facing the first surface 5a. The first surface 5a and the second surface 5b are mutually parallel. A reflective coat for transmitting and reflecting the blue-violet laser beam at a predetermined ratio is formed on the first surface 5a, and a diffraction grating is formed on the second surface 5b.

Figure 6:
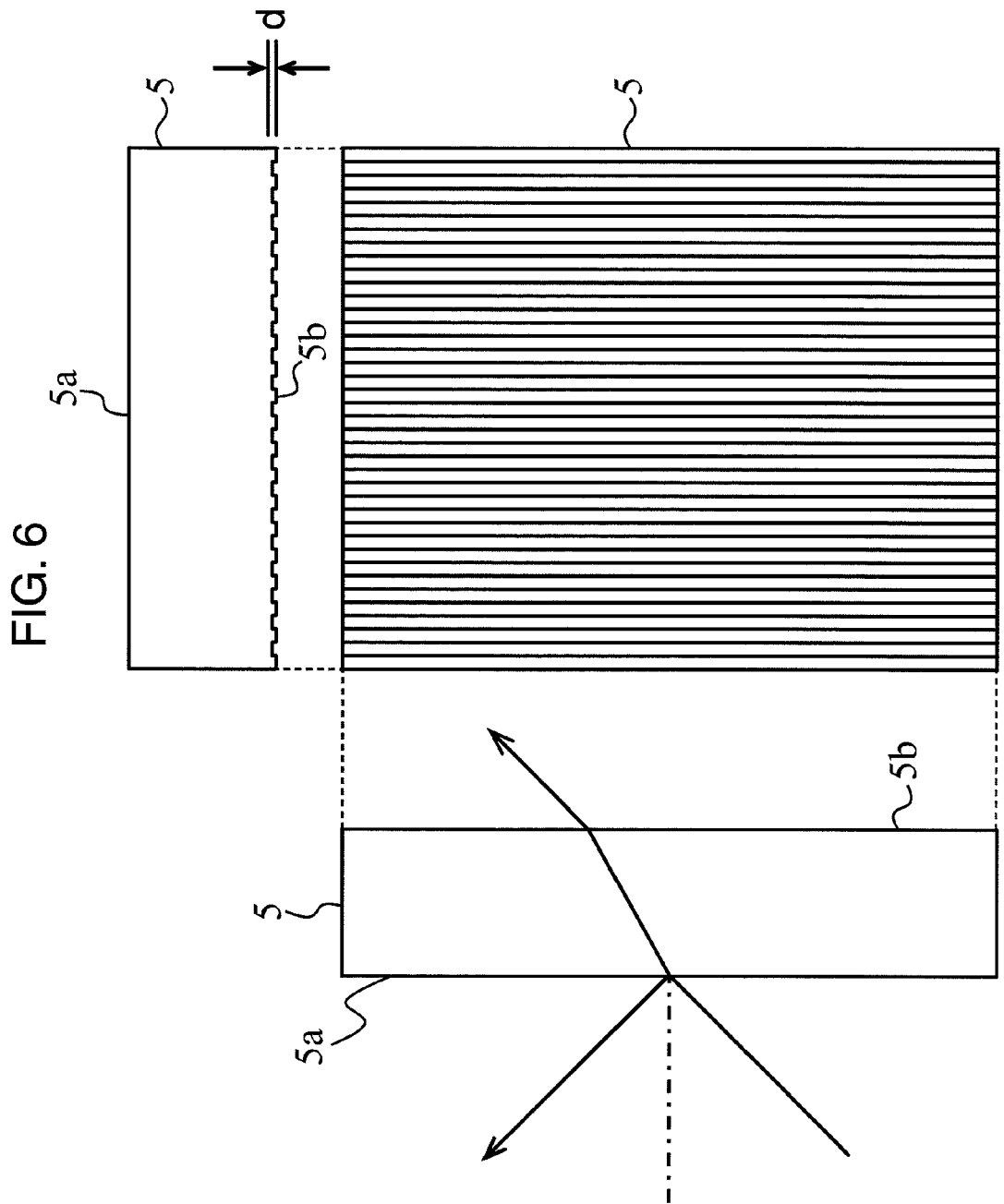
FIG. 6 is a diagram showing the schematic configuration of the mirror with a diffraction grating in the first embodiment of the present invention.

FIG. 6 is a diagram showing the schematic configuration of the mirror with a diffraction grating 5 in the first embodiment of the present invention. The mirror with a diffraction grating 5 is a planar mirror. A reflective coat that reflects 90% reflects and 10% transmits the blue-violet laser beam that enters at an angle of 45 deg is formed on the surface of the light incident side (first surface) 5a of the mirror with a diffraction grating 5. Meanwhile, a diffraction grating parallel to the incident plane of the blue-violet laser beam that enters at an angle of 45 deg is formed on the surface of the light emission side (second surface) 5b of the mirror with a diffraction grating 5.

The diffraction grating has a concave and convex pattern in which a plurality of straight lines parallel to the incident plane of the blue-violet laser beam are aligned in parallel. The diffraction grating splits the blue-violet laser beam that passed through the second surface 5b into zero order light and ±first order diffracted light, and splits the blue-violet laser beam that was internally reflected by the second surface 5b into zero order light and ±first order diffracted light. A general AR (Anti-Reflection) coat is formed on the second surface 5b for inhibiting the internal reflection. The first surface 5a and the second surface 5b are mutually parallel.

This kind of mirror with a diffraction grating 5 can be prepared by cutting a parallel plane substrate in which the foregoing reflective coat is formed on the first surface 5a and the foregoing diffraction grating and AR coat are formed on the second surface 5b. Accordingly, it is possible to create this inexpensively in comparison to a wedge-shaped reflective mirror, a wedge-shaped beam splitter or the like.

Here, since the blue-violet laser beam that passes through the second surface 5b on which a diffraction grating is formed and the blue-violet laser beam that is reflected by the second surface 5b will have a different phase difference caused by the depth d of the diffraction grating, the diffraction efficiency of the zero order light and ±first order diffracted light is respectively different.

Figure 7:
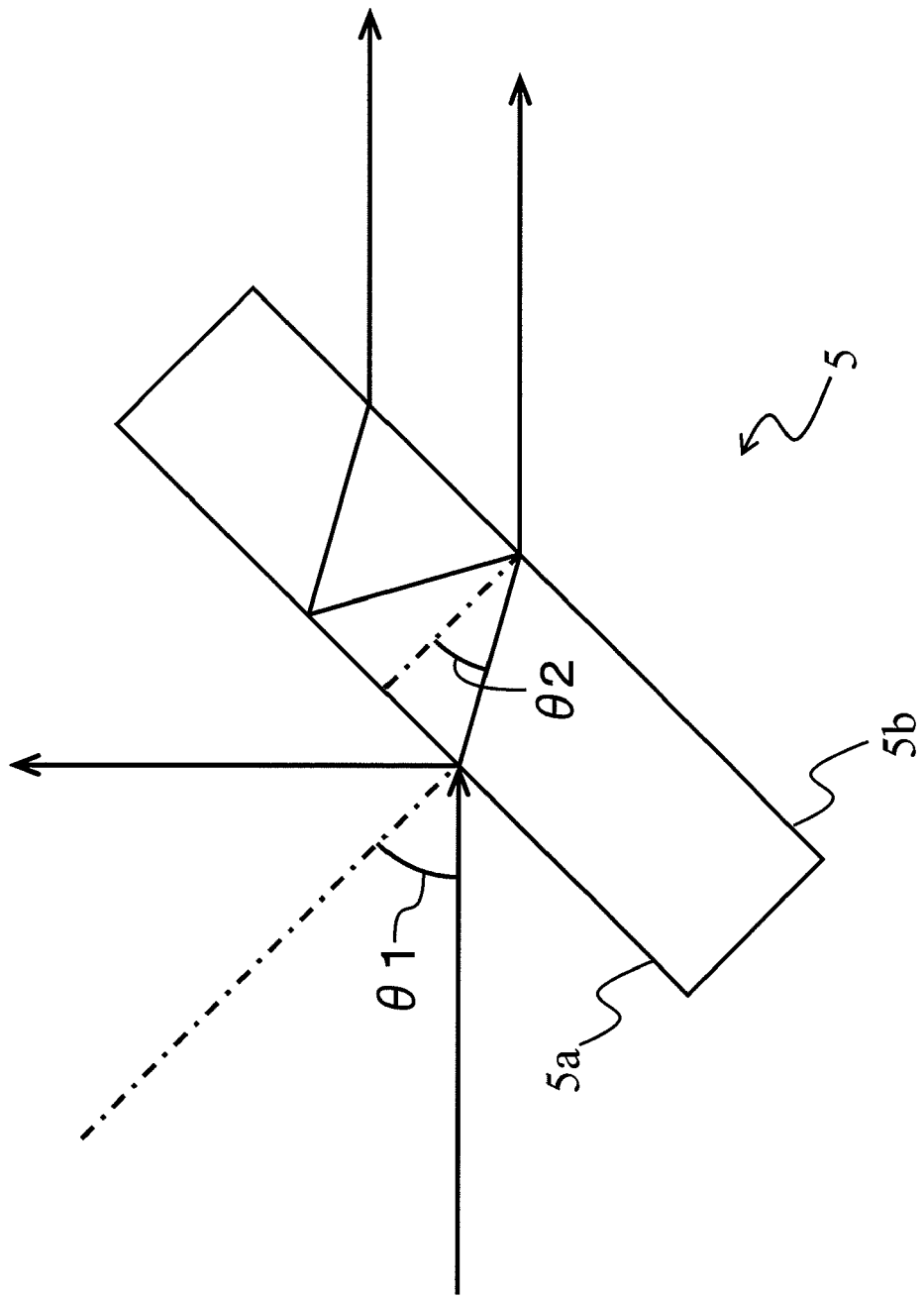
FIG. 7 is a diagram showing the condition of the transmitted light and the reflected light of the mirror with a diffraction grating in the first embodiment of the present invention.

FIG. 7 is a diagram showing the condition of the transmitted light and the reflected light of the mirror with a diffraction grating in the first embodiment of the present invention. As shown in FIG. 7, the blue-violet laser beam that entered the first surface 5a of the mirror with a diffraction grating 5 at an angle θ1 (=45 deg) is refracted by the first surface 5a, and enters the second surface 5b at an angle θ2 (=28.75 deg). If the depth of the diffraction grating is d and the refractive index of the diffraction grating is n, the phase difference δ1 that occurs upon passing through the diffraction grating will be the difference between d×(1/cos(θ1)) and d×(n/cos(θ2)) as shown in following Formula (1).

$$\delta 1 = d \times \{1/\cos(\theta 1) - n/\cos(\theta 2)\} \quad (1)$$

Meanwhile, the phase difference δ2 that occurs upon the internal reflection of the diffraction grating will be as following Formula (2).

$$\delta 2 = 2d \times n \times \cos(\theta 2) \quad (2)$$

Figure 8:
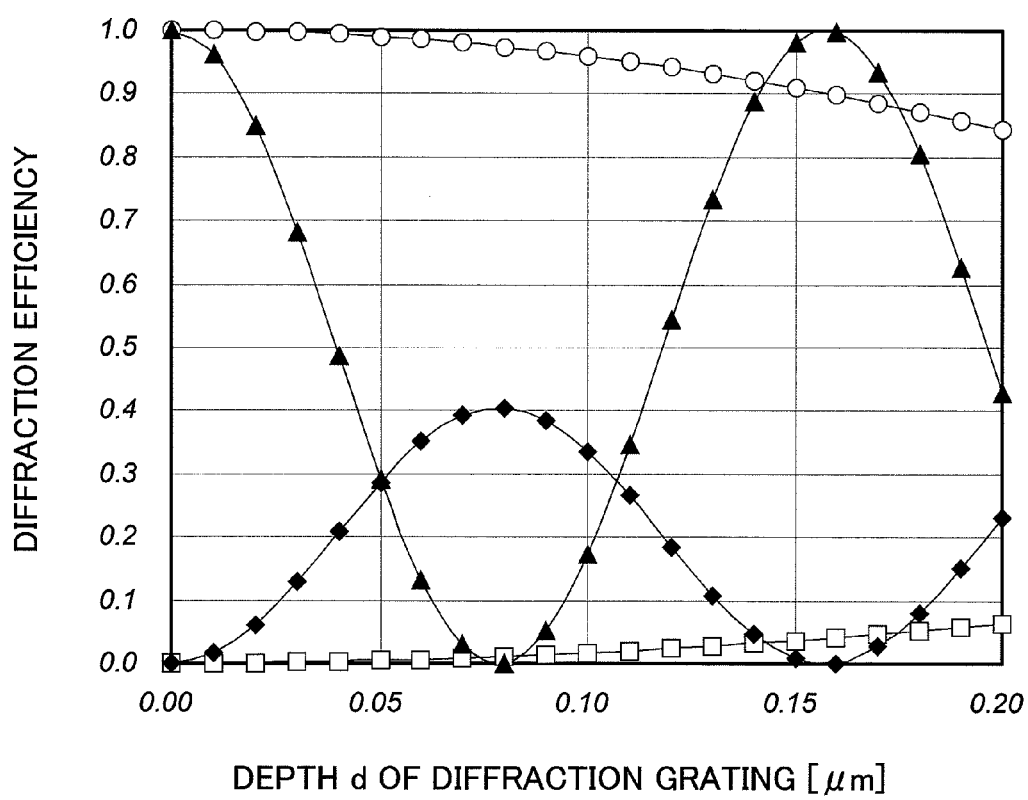
FIG. 8 is a diagram showing the relationship between the depth of the diffraction grating, and the respective diffraction efficiencies of the transmitted zero order light, the transmitted±first order diffracted light, the internally reflected zero order light, and the internally reflected±first order diffracted light.

FIG. 8 shows the relationship between the depth d of the diffraction grating, and the respective diffraction efficiencies of the transmitted zero order light that passed through the second surface 5b, the ±first order diffracted light that passed through the second surface 5b, the zero order light that was internally reflected by the second surface 5b, and the ±first order diffracted light that was internally reflected by the second surface 5b. The calculation conditions of the diffraction grating are as follows. Specifically, the design wavelength λ of the diffraction grating is 405 nm, the angle of incidence θ1 of the blue-violet laser beam to the first surface is 45 deg, and the refractive index n of the diffraction grating is 1.47.

In FIG. 8, the horizontal axis shows the depth d of the diffraction grating, and the vertical axis shows the diffraction efficiencies of the transmitted zero order light, the transmitted±first order diffracted light, the internally reflected zero order light and the internally reflected±first order diffracted light. In addition, in FIG. 8, the white circles show the zero order light that passed through the second surface 5b, the white squares show the ±first order diffracted light that passed through the second surface 5b, the black triangles show the zero order light that was internally reflected by the second surface 5b, and the black squares show the ±first order diffracted light that was internally reflected by the second surface 5b.

As shown in FIG. 8, when the depth d of the diffraction grating is 0.08 μm, the diffraction efficiency (reflectance) of the internally reflected zero order light will be approximately zero, and the diffraction efficiency of the internally reflected±first order diffracted light will be 41%, respectively. Here, the diffraction efficiency (transmittance) of the transmitted zero order light will be 97%, and the diffraction efficiency of the transmitted±first order diffracted light will be 1%.

As described above, in the first embodiment, as a result of using the difference between the phase difference δ1 and the phase difference δ2 when the depth d of the diffraction grating formed on the second surface of the mirror with a diffraction grating 5 is set to a predetermined value, the diffraction grating is designed so as to satisfy following Formula (3) and Formula (4).

Diffraction efficiency of transmitted zero order light>diffraction efficiency of transmitted±first order diffracted light (3)

Diffraction efficiency of internally reflected zero order light<diffraction efficiency of internally reflected±first order diffracted light (4)

In the mirror with a diffraction grating 5 of the first embodiment, the depth d of the diffraction grating that is formed on the second surface 5b is 0.08 μm. Thus, the diffraction efficiency (reflectance) of the zero order light of the blue-violet laser beam that is headed toward the front monitor sensor 24 after being internally reflected at least two or more times by the mirror with a diffraction grating 5 will be substantially zero. Moreover, the ±first order diffracted light of the blue-violet laser beam that is headed toward the front monitor sensor 24 after being internally reflected at least two or more times by the mirror with a diffraction grating 5 will be diffracted by the diffraction grating parallel to the incident plane of the laser beam that enters at an angle of 45 deg. Accordingly, the blue-violet laser beam that is headed toward the front monitor sensor 24 after being internally reflected by the mirror with a diffraction grating 5 will not be parallel to the blue-violet laser beam that is headed toward the front monitor sensor 24 after passing through the mirror with a diffraction grating 5 even if the blue-violet laser beam that enters the mirror with a diffraction grating 5 is parallel light.

As described above, with the optical head which detects an APC signal by transmitting a part of the blue-violet laser beam that entered the planar mirror with a diffraction grating 5 and causing it to enter the front monitor sensor 24, as a result of using the mirror with a diffraction grating 5 of the first embodiment, it is possible to inhibit the interference of the blue-violet laser beam in the effective region of the front monitor sensor 24 even if the blue-violet laser beam that enters the mirror with a diffraction grating 5 is parallel light, and it is thereby possible to obtain an APC signal that is accurately proportionate to the quantity of outgoing light of the blue-violet laser light source 1.

Accordingly, an inexpensive planar reflective mirror can also be used in an optical head for a multilayer optical disc in which the space between the adjacent information recording surfaces is small and there is no choice but to record or reproduce information at a position where the laser beam that is emitted from the collimator lens becomes parallel light in the movable range of the collimator lens.

Moreover, the blue-violet laser beam that entered the mirror with a diffraction grating 5 passes through the second surface 5b, is internally reflected by the second surface 5b and the first surface 5a, and subsequently passes through the second surface 5b. Here, the blue-violet laser beam that passed through the second surface 5b without being internally reflected and the blue-violet laser beam that passed through the second surface 5b after being internally reflected will be diffracted with respectively different diffraction efficiencies based on the diffraction grating.

Accordingly, even if the blue-violet laser beam that enters the mirror with a diffraction grating 5 is parallel light, since the ±first order diffracted light of the blue-violet laser beam that passes through the second surface 5b after being internally reflected by the mirror with a diffraction grating 5 will not be parallel to the blue-violet laser beam that passed through the second surface 5b without being internally reflected by the mirror with a diffraction grating 5, it is possible to inhibit the interference of the blue-violet laser beam in the effective region of the front monitor sensor 24 for controlling the laser power of the blue-violet laser light source 1, and it is thereby possible to accurately control the laser power of the blue-violet laser beam that is emitted from the blue-violet laser light source 1.

Incidentally, since there is no need to enlarge the diffraction angle of the ±first order diffracted light in order to inhibit the interference, the pitch p of the diffraction grating may be sufficiently larger than the design wavelength λ of the laser beam; for example, it may be approximately 10 to 100 μm. In other words, the pitch p of the diffraction grating satisfies p>λ.

Moreover, based on foregoing Formula (1) and Formula (2), if the diffraction efficiency (reflectance) of the internally reflected zero order light is approximately zero, the larger the angle of incidence θ1, the larger the diffraction efficiency (transmittance) of the transmitted zero order light. Nevertheless, the mirror with a diffraction grating 5 that is applied to the optical head of the first embodiment uses a reflective mirror for reflecting the laser beam that is emitted from the collimator lens so that it enters the information recording surface of the multilayer optical disc perpendicularly. In the foregoing case, the angle of incidence θ1 is preferably 45±10 [deg], and the angle of incidence θ1 is more preferably 45±3 [deg].

Meanwhile, as shown in FIG. 8, as a result of the depth d of the diffraction grating deviating from 0.08 μm, the diffraction efficiency (reflectance) of the internally reflected zero order light will deviate from the design value (=0). For example, if the depth d of the diffraction grating is in the range of 0.08±0.01 μm, the diffraction efficiency (reflectance) of the internally reflected zero order light will be less than 5%. As described above, an anti-reflection AR coat is formed on the second surface 5b of the mirror with a diffraction grating 5, and the inner reflectance is suppressed to be less than 2%. Accordingly, since the diffraction efficiency (reflectance) of the internally reflected zero order light will be less than 0.1%, it is possible to sufficiently inhibit the interference of the laser beam in the effective region of the front monitor sensor 24.

Specifically, if a glass material having a standard refractive index n ($1.3 \leq n \leq 1.7$) is used, it is possible to inhibit the diffraction efficiency (reflectance) of the substantially internally reflected zero order light to a problem-free level by the depth d of the diffraction grating satisfying $\lambda/6 \leq d \leq \lambda/4$ in relation to the design wavelength λ (for example, λ=405 nm).

Although the mirror with a diffraction grating 5 of the first embodiment was explained based on a case of forming a diffraction grating parallel to the incident plane of the blue-violet laser beam that enters at an angle of 45 deg, the diffraction grating is not limited to the foregoing shape. Specifically, the gist of the present invention is to achieve a shape so that the internally reflected±first order light will not become parallel with the laser beam that is headed toward the front monitor sensor upon passing through the mirror with a diffraction grating and, for example, it is also possible to form a diffraction grating that is perpendicular to the incident plane of the blue-violet laser beam that enters at an angle of 45 deg, or form an annular diffraction grating. Moreover, the cross section shape is not limited to the binary diffraction grating as shown in FIG. 6, and it may also be a blazed diffraction grating. Since a binary diffraction grating can be easily formed by way of etching or the like, it is more preferable as the mirror with a diffraction grating of this embodiment.

Figure 9:
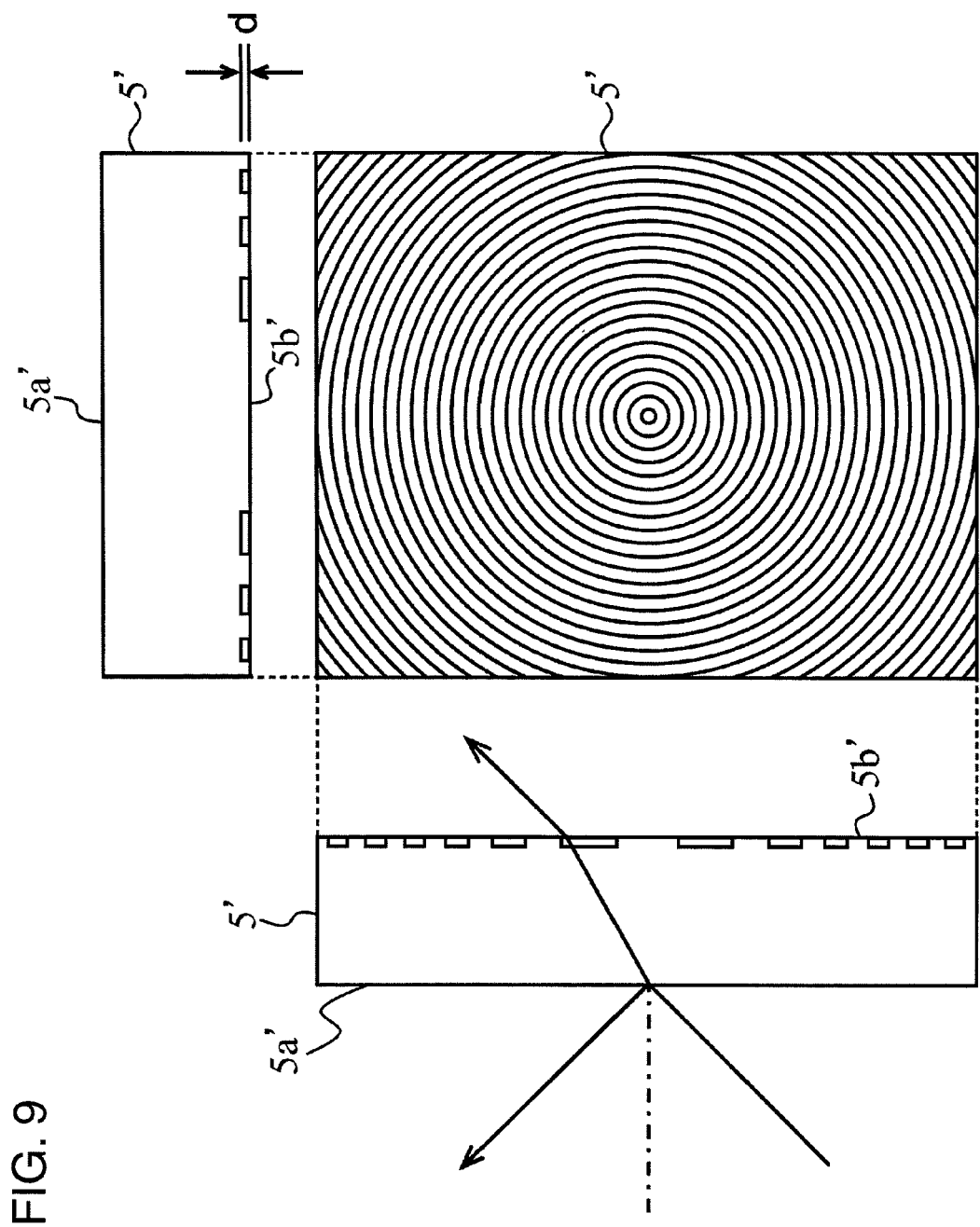
FIG. 9 is a diagram showing the schematic configuration of the mirror with a diffraction grating in a modified example of the first embodiment of the present invention.

FIG. 9 is a diagram showing the schematic configuration of the mirror with a diffraction grating in a modified example of the first embodiment of the present invention. The mirror with a diffraction grating 5' shown in FIG. 9 is a planar mirror. A reflective coat that reflects 90% reflects and 10% transmits the blue-violet laser beam that enters at an angle of 45 deg is formed on the surface of the light incident side (first surface) 5a' of the mirror with a diffraction grating 5'. Meanwhile, a diffraction grating having an annular concave and convex pattern around the incident light axis of the blue-violet laser beam is formed on the surface of the light emission side (second surface) 5b' of the mirror with a diffraction grating 5'.

The diffraction grating splits the blue-violet laser beam that passed through the second surface 5b' into zero order light and ±first order diffracted light, and splits the blue-violet laser beam that was internally reflected by the second surface 5b into zero order light and ±first order diffracted light. A general AR (Anti-Reflection) coat is formed on the second surface 5b' for inhibiting the internal reflection. The first surface 5a' and the second surface 5b' are mutually parallel.

This kind of mirror with a diffraction grating 5' can be prepared by cutting a parallel plane substrate in which the foregoing reflective coat is formed on the first surface 5a' and the foregoing diffraction grating and AR coat are formed on the second surface 5b'. Accordingly, it is possible to create this inexpensively in comparison to a wedge-shaped reflective mirror, a wedge-shaped beam splitter or the like.

Incidentally, since the mirror with a diffraction grating 5' has the same functions and characteristics as the mirror with a diffraction grating 5 other than the pattern of the diffraction grating, the detailed explanation thereof is omitted.

Preferably, the mirror with a diffraction grating 5 is formed in a suitable shape so that the internally reflected±first order light will not reflect on the optical surface of the peripheral element or a planar surface in the optical head and infiltrate the light receiving element or the like; that is, so that the internally reflected±first order light will not become stray light.

With a multilayer optical disc in which the space between the information recording surfaces relatively large, the required moving range of the collimator lens upon collecting the laser beam on a predetermined information recording surface and the required moving range of the collimator lens upon collecting the laser beam on the information recording surface that is adjacent to such predetermined information recording surface will not overlap. In the foregoing case, it is preferable to configure the optical head so that the position of the collimator lens in which the laser beam that is emitted from the collimator lens will become parallel light will be outside the required moving range of the collimator lens upon collecting the laser beam on any of the information recording surfaces.

As a result of adopting the foregoing configuration, since the laser beam that is emitted from the collimator lens will become converging light or diverging light in the required moving range of the collimator lens upon collecting the laser beam on any one of the information recording surfaces, it is possible to inhibit the interference of the laser beam in the effective region of the front monitor sensor even when using a planar beam splitter that is not equipped with a diffraction grating.

Second Embodiment

Figure 10:
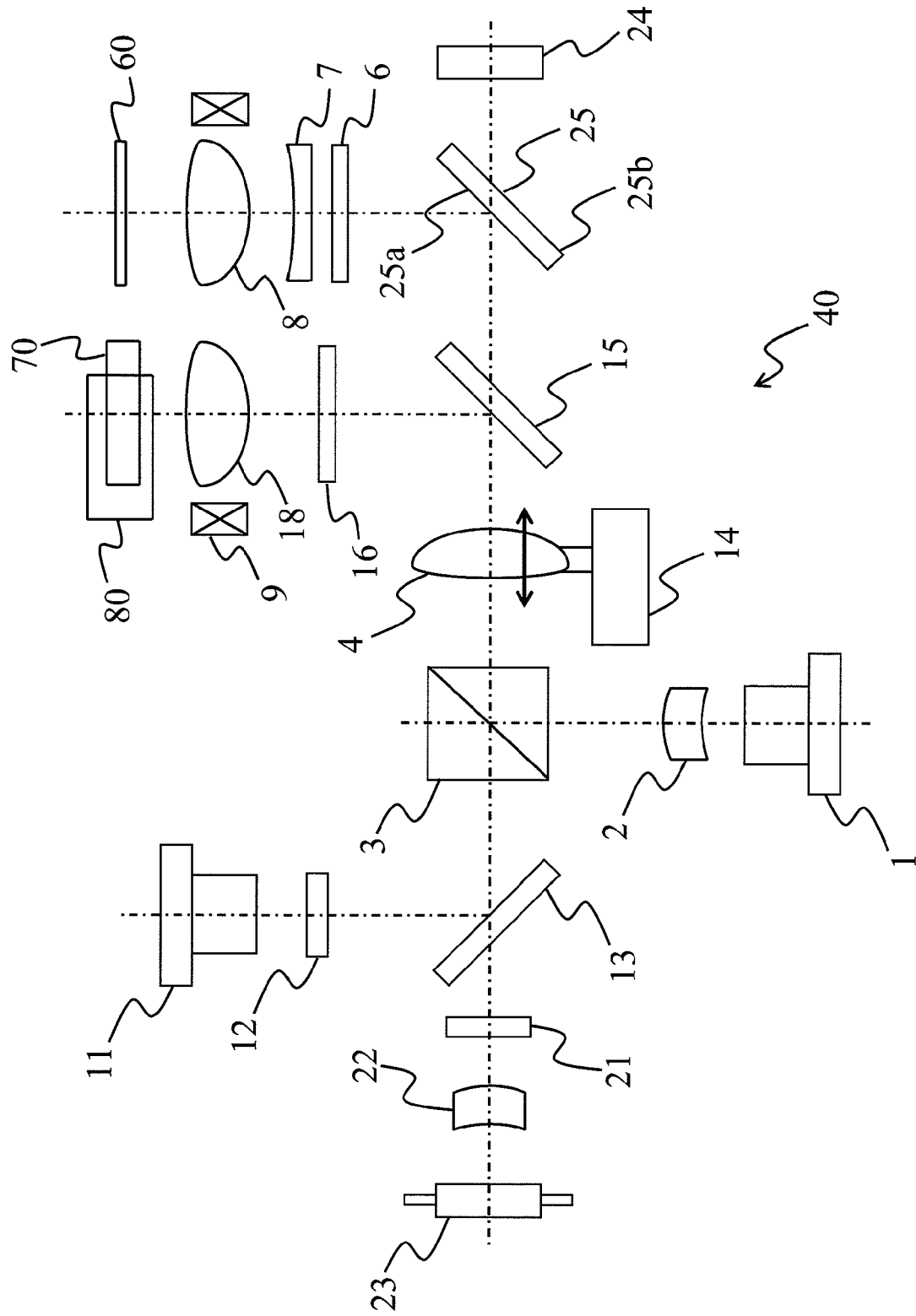
FIG. 10 is a diagram showing the schematic configuration of the optical head in the second embodiment of the present invention.

FIG. 10 shows the schematic configuration of the optical head in the second embodiment of the present invention. In the second embodiment, the same reference numeral is given to the same constituent element that is common with the first embodiment, and the explanation thereof is omitted.

An optical head 40 shown in FIG. 10 comprises a blue-violet laser light source 1, a relay lens 2, a polarizing beam splitter 3, a collimator lens 4, a mirror with a diffraction grating 25, a quarter wavelength plate 6, a diffraction lens 7, an objective lens 8, an objective lens actuator 9, a dual wavelength laser light source 11, a diffraction grating 12, a planar beam splitter 13, a collimator lens actuator 14, a planar mirror 15, a quarter wavelength plate 16, a compatible objective lens 18, a detection hologram 21, a detection lens 22, a light receiving element 23 and a front monitor sensor 24.

Moreover, as shown in FIG. 2, the multilayer optical disc 60 has four information recording surfaces L0 to L3 each having a light transmitting layer with a thickness d0 to d3 of 55 μm, 69 μm, 83 μm, and 100 μm respectively.

The dual wavelength laser light source 11 emits a red laser beam having a second wavelength λ2 (for example, approximately 660 nm) that is larger than the first wavelength λ1 (for example, approximately 405 nm), and emits an infrared laser beam having a third wavelength λ3 (for example, approximately 785 nm) that is larger than the second wavelength λ2. The planar mirror 15 transmits and reflects the red laser beam at a predetermined ratio, and substantially transmits the blue-violet laser beam. The planar mirror 15 transmits and reflects the infrared laser beam at a predetermined ratio.

The compatible objective lens 18 converges the red laser beam on an information recording surface of a DVD 70 of a type that is different from the multilayer optical disc 60. The compatible objective lens 18 converges the infrared laser beam on an information recording surface of a CD 80 of a type that is different from the multilayer optical disc 60 and the DVD 70.

The collimator lens actuator 14 causes diverging light or converging light to enter the compatible objective lens 18 upon recording or reproducing information to or from the information recording surface of the DVD 70 or the CD 80. More specifically, the collimator lens actuator 14 causes converging light to enter the compatible objective lens 18 upon recording or reproducing information to or from the information recording surface of the DVD 70, and causes diverging light to enter the compatible objective lens 18 upon recording or reproducing information to or from the information recording surface of the CD 80.

The operation of the optical head 40 upon recording or reproducing information to or from the multilayer optical disc 60 is now explained. The blue-violet laser beam having a wavelength of approximately 405 nm that was emitted from the blue-violet laser light source 1 is converted into diverging light having a different NA by the relay lens 2, and enters the polarizing beam splitter 3 by S polarization. The laser beam that was reflected by the polarizing beam splitter 3 is converted into approximately parallel light with the collimator lens 4, passes through the planar mirror 15, and enters the mirror with a diffraction grating 25. A part of the blue-violet laser beam that entered the mirror with a diffraction grating 25 is reflected in the direction of the quarter wavelength plate 6. The other part of the laser beam that entered the mirror with a diffraction grating 25 passes through the mirror with a diffraction grating 25, and subsequently enters the front monitor sensor 24. Then the output of the blue-violet laser light source 1 is controlled based on the output of the front monitor sensor 24.

Meanwhile, the laser beam that was reflected by the mirror with a diffraction grating 25 is converted into circular polarized light by the quarter wavelength plate 6, and thereafter passes through the diffraction lens 7. The laser beam that passed through the diffraction lens 7 is converged as a light spot onto any one of the information recording surfaces L0 to L3 of the multilayer optical disc 60 by the objective lens 8.

The blue-violet laser beam that is reflected by the predetermined information recording surface of the multilayer optical disc 60 passes through the objective lens 8 and the diffraction lens 7 once again, is converted into linear polarized light that is different from the outward path by the quarter wavelength plate 6, and subsequently reflected by the mirror with a diffraction grating 25. The laser beam that is reflected by the mirror with a diffraction grating 25 passes through the planar mirror 15 and the collimator lens 4, and subsequently enters the polarizing beam splitter 3 by P polarization. The laser beam that passed through the polarizing beam splitter 3 is guided to the light receiving element 23 via the detection hologram 21 and the detection lens 22. The laser beam that was detected with the light receiving element 23 is subject to photoelectric conversion. The signal created by photoelectric conversion is operated with the control unit described later, and a focus error signal for following the surface fluctuation of the multilayer optical disc 60 and a tracking error signal for following the eccentricity of the multilayer optical disc 60 are created.

The operation of the optical head 40 upon recording or reproducing information to or from the DVD 70 is now explained. The red laser beam having a wavelength of approximately 660 nm that was emitted from the dual wavelength laser light source 11 is split into a main beam as the zero order light and a sub beam as the ±first order diffracted light by the diffraction grating 12. The main beam and the sub beam are reflected by the planar beam splitter 13, and pass through the polarizing beam splitter 3. The red laser beam that passed through the polarizing beam splitter 3 is converted into converging light with the collimator lens 4, and enters the planar mirror 15. A part of the red laser beam that entered the planar mirror 15 is reflected in the direction of the quarter wavelength plate 16. The other part of the red laser beam that entered the planar mirror 15 passes through the planar mirror 15 and the mirror with a diffraction grating 25, and subsequently enters the front monitor sensor 24. Then, the output of the red laser beam of the dual wavelength laser light source 11 is controlled based on the output of the front monitor sensor 24.

Meanwhile, the red laser beam that was reflected by the planar mirror 15 is converted into circular polarized light with the quarter wavelength plate 16, and subsequently converged as a light spot on the information recording surface of the DVD 70 by the compatible objective lens 18.

The red laser beam that was reflected by the information recording surface of the DVD 70 pass through the compatible objective lens 18 once again, is converted into linear polarized light that is different from the outward path by the quarter wavelength plate 16, and subsequently reflected by the planar mirror 15. The red laser beam that was reflected by the planar mirror 15 passed through the collimator lens 4, and subsequently enters the polarizing beam splitter 3 and the planar beam splitter 13 by P polarization. The red laser beam that passed through the polarizing beam splitter 3 and the planar beam splitter 13 is guided to the light receiving element 23 via the detection hologram 21 and the detection lens 22. The red laser beam that is detected with the light receiving element 23 is subject to photoelectric conversion. The signal created by photoelectric conversion is operated with the control unit described later, and a focus error signal for following the surface fluctuation of the DVD 70 and a tracking error signal for following the eccentricity of the DVD 70 are created.

The operation of the optical head 40 upon recording or reproducing information to or from the CD 80 is explained. The infrared laser beam having a wavelength of approximately 785 nm that was emitted from the dual wavelength laser light source 11 is split into a main beam as the zero order light and a sub beam as a ±first order diffracted light by the diffraction grating 12. The main beam and the sub beam are reflected by the planar beam splitter 13, and enter the polarizing beam splitter 3. The infrared laser beam that passed through the polarizing beam splitter 3 is converted into diverging light with a different NA by the collimator lens 4, and enters the planar mirror 15. A part of the infrared laser beam that entered the planar mirror 15 is reflected in the direction of the quarter wavelength plate 16. The other part of the infrared laser beam that entered the planar mirror 15 passes through the planar mirror 15 and the mirror with a diffraction grating 25, and subsequently enters the front monitor sensor 24. Then, the output of the infrared laser beam of the dual wavelength laser light source 11 is controlled based on the output of the front monitor sensor 24.

Meanwhile, the infrared laser beam that was reflected by the planar mirror 15 is converted into circular polarized light by the quarter wavelength plate 16, and subsequently converged as a light spot on the information recording surface of the CD 80 by the compatible objective lens 18.

The infrared laser beam that was reflected by the information recording surface of the CD 80 passes through the compatible objective lens 18 once again, is converted into linear polarized light that is different from the outward path by the quarter wavelength plate 16, and subsequently reflected by the planar mirror 15. The infrared laser beam that was reflected by the planar mirror 15 passes through the collimator lens 4, and subsequently enters the polarizing beam splitter 3 and the planar beam splitter 13 by P polarization. The infrared laser beam that passed through the polarizing beam splitter 3 and the planar beam splitter 13 is guided to the light receiving element 23 via the detection hologram 21 and the detection lens 22. The infrared laser beam that was detected with the light receiving element 23 is subject to photoelectric conversion. The signal that was created by photoelectric conversion is operated with the control unit described later, and a focus error signal for following the surface fluctuation of the CD 80 and a tracking error signal for following the eccentricity of the CD 80 are created.

Incidentally, in the second embodiment, the blue-violet laser beam corresponds to an example of the first laser beam, the blue-violet laser light source 1 corresponds to an example of the first light source, the mirror with a diffraction grating 25 corresponds to an example of the first planar optical element, the multilayer optical disc 60 corresponds to an example of the first information recording medium, the objective lens 8 corresponds to an example of the first objective lens, the light receiving element 23 corresponds to an example of the first photodetector, the front monitor sensor 24 corresponds to an example of the second photodetector, the collimator lens actuator 14 corresponds to an example of the spherical aberration correction unit, the red laser beam corresponds to an example of the second laser beam, the infrared laser beam corresponds to an example of the third laser beam, the dual wavelength laser light source 11 corresponds to an example of the second light source and the third light source, the planar mirror 15 corresponds to an example of the second planar optical element, the DVD 70 corresponds to an example of the second information recording medium, the compatible objective lens 18 corresponds to an example of the second objective lens, and the CD 80 corresponds to an example of the third information recording medium.

The detection of the focus error signal and the detection of the tracking error signal in the optical head of the second embodiment are now explained.

The focus error signal for following the surface fluctuation of the DVD 70 and the CD 80 is detected using the so-called astigmatism method or the like of detecting the focal spot provided by the detection lens 22 based on astigmatism with a quartered light receiving pattern in the light receiving element 23.

Meanwhile, the tracking error signal for following the eccentricity of the DVD 70 and the CD 80 is detected using the so-called three beam method or differential push-pull method (DPP method) using the main beam and the sub beam which are created with the diffraction grating 12.

The compatible objective lens in the second embodiment is now explained.

The compatible objective lens 18 comprises a diffraction structure for respectively collecting the red laser beam for recording or reproducing information to or from the DVD 70 and the infrared laser beam for recording or reproducing information to or from the CD 80 as a fine light spot by using the difference in wavelength.

In the second embodiment, when recording or reproducing information to or from the DVD 70, converging light is caused to enter the compatible objective lens 18 at a predetermined convergent angle by moving the collimator lens 4 to the objective lens side. Moreover, when recording or reproducing information to or from the CD 80, diverging light is caused to enter the compatible objective lens 18 at a predetermined divergence angle by moving the collimator lens 4 to the light source side. The compatible objective lens 18 of the second embodiment is designed so that the third order spherical aberration will be minimal in relation to the thickness of the light transmitting layer of the DVD 70 or the CD 80.

Incidentally, as shown in FIG. 5A, when the collimator lens 4 is in the reference position, the outgoing beam of the collimator lens 4 will be approximately parallel light. Meanwhile, as shown in FIG. 5B, as a result of moving the collimator lens 4 from the reference position to a predetermined position on the light source side, the outgoing beam of the collimator lens 4 becomes diverging light having a predetermined divergence angle. It is thereby possible to record or reproduce information to or from the CD 80. Meanwhile, as shown in FIG. 5C, as a result of moving the collimator lens 4 from the reference position to a predetermined position on the objective lens side, the outgoing beam of the collimator lens 4 becomes converging light having a predetermined convergent angle. It is thereby possible to record or reproduce information to or from the DVD 70.

As with the first embodiment, in the multilayer optical disc 60 having a plurality of information recording surfaces, it is possible to correct the third order spherical aberration by moving the collimator lens 4 according to the thickness of the light transmitting layer of the respective information recording surfaces.

Incidentally, the compatible objective lens 18 is not limited to an objective lens comprising the foregoing diffraction structure, and it may also be a refraction-type objective lens that uses the wavelength dispersion characteristics of a plurality of glass materials, or a pair lens that combines a plurality of diffraction-type and refraction-type lenses.

As described above, the optical head 40 of the second embodiment comprises compatibility, and it is possible to record or reproduce information to or from different types of optical discs; for instance, to or from the multilayer optical disc 60, the DVD 70 and the CD 80.

The mirror with a diffraction grating in the second embodiment is now explained.

As shown in FIG. 10, the mirror with a diffraction grating 25 of the second embodiment mainly reflects the blue-violet laser beam that is emitted from the collimator lens 4, and bends most of the reflected part of the blue-violet laser beam in the direction of the objective lens 8. Moreover, the mirror with a diffraction grating 25 transmits a part of the blue-violet laser beam, most of the red laser beam, and most of the infrared laser beam, and causes the respective transmitted laser beams to enter the front monitor sensor 24.

The mirror with a diffraction grating 25 is a planar mirror. A reflective coat having wavelength selectivity that reflects 90% reflects and 10% transmits the blue-violet laser beam that enters at an angle of 45 deg and reflects nearly 100% of the red laser beam and the infrared laser beam is formed on the surface of the light incident side (first surface) 25a of the mirror with a diffraction grating 25.

Meanwhile, a diffraction grating parallel to the entrance place of the blue-violet laser beam that enters at an angle of 45 deg is formed on the surface of the light emission side (second surface) 25b of the mirror with a diffraction grating 25. The diffraction grating splits the blue-violet laser beam that passed through the second surface 25b into zero order light and ±first order diffracted light, and splits the blue-violet laser beam that was internally reflected by the second surface 25b into zero order light and ±first order diffracted light. An AR coat corresponding to the three wavelengths of the blue-violet laser beam, the red laser beam and the infrared laser beam is formed on the second surface 25b for inhibiting the internal reflection. The first surface 25a and the second surface 25b are mutually parallel.

This kind of mirror with a diffraction grating 25 can be prepared by cutting a parallel plane substrate in which the foregoing reflective coat having wavelength selectivity is formed on the first surface 25a and the foregoing diffraction grating and AR coat are formed on the second surface 25b. Accordingly, it is possible to create this inexpensively in comparison to a wedge-shaped reflective mirror, a wedge-shaped beam splitter or the like.

In the mirror with a diffraction grating 25 of the second embodiment, as with the mirror with a diffraction grating 5 explained in the first embodiment, the depth d of the diffraction grating that is formed on the second surface 25b is 0.08 µm. Thus, the diffraction efficiency (reflectance) of the zero order light of the blue-violet laser beam that is headed toward the front monitor sensor 24 after being internally reflected at least two or more times by the mirror with a diffraction grating 25 will be substantially zero. Moreover, the ±first order diffracted light of the blue-violet laser beam that is headed toward the front monitor sensor 24 after being internally reflected at least two or more times by the mirror with a diffraction grating 25 will be diffracted by the diffraction grating parallel to the incident plane of the laser beam that enters at an angle of 45 deg. Accordingly, the blue-violet laser beam that is headed toward the front monitor sensor 24 after being internally reflected by the mirror with a diffraction grating 25 will not be parallel to the blue-violet laser beam that is headed toward the front monitor sensor 24 after passing through the mirror with a diffraction grating 25 even if the blue-violet laser beam that enters the mirror with a diffraction grating 25 is parallel light.

Meanwhile, the diffraction efficiency (transmittance) of the zero order light of the red laser beam and the infrared laser beam that is headed toward the front monitor sensor 24 after passing through the second surface 25b will be 98% or higher. The zero order light transmittance η1 of the blue-violet laser beam in the diffraction grating is smaller than the zero order light transmittance η2 of the red laser beam and the infrared laser beam in the diffraction grating. Moreover, the reflectance of the red laser beam and the infrared laser beam in the first surface 25a is sufficiently small and is less than 5%. Thus, the quantity of light of the red laser beam and the infrared laser beam that is headed toward the front monitor sensor 24 after being internally reflected at least two or more times by the mirror with a diffraction grating 25 will become sufficiently small.

The red laser beam and the infrared laser beam respectively enter the planar mirror 15 as converging light and diverging light. Specifically, the collimator lens actuator 14 causes converging light to enter the compatible objective lens 18 upon recording or reproducing information to or from the information recording surface of the DVD 70, and causes diverging light to enter the compatible objective lens 18 upon recording or reproducing information to or from the information recording surface of the CD 80. Thus, the optical axis of the laser beam that passed through the planar mirror 15 and the mirror with a diffraction grating 25 and is headed toward the front monitor sensor 24 and the optical axis of the laser beam that was internally reflected two or more times in the planar mirror 15, subsequently entered the mirror with a diffraction grating 25, passed through the mirror with a diffraction grating 25, and is subsequently headed toward the front monitor sensor 24 will not be mutually parallel.

As described above, with the optical head which detects an APC signal by transmitting a part of the blue-violet laser beam that entered the planar mirror with a diffraction grating 25 and causing it to enter the front monitor sensor 24, as a result of using the mirror with a diffraction grating 25 of the second embodiment, it is possible to inhibit the interference of the laser beam in the effective region of the front monitor sensor 24 even if the laser beam that enters the mirror with a diffraction grating 25 is parallel light, and it is thereby possible to obtain an APC signal that is accurately proportionate to the quantity of outgoing light of the blue-violet laser light source 1 and the dual wavelength laser light source 11.

Incidentally, although an AR coat correspond to the three wavelengths of the blue-violet laser beam, the red laser beam and the infrared laser beam is formed on the second surface 25b of the mirror with a diffraction grating 25 in the second embodiment, the present invention is not limited thereto. An AR coat having prescribed reflectance and transmittance in relation to the blue-violet laser beam may be formed on the second surface 25b of the mirror with a diffraction grating 25 in order to prevent the internal reflection of the blue-violet laser beam. Since this AR coat is optimized for the blue-violet laser beam, several % of the red laser beam and the infrared laser beam will be internally reflected. Specifically, the reflectance for the blue-violet laser beam is less than 1% and the reflectance for the red laser beam and the infrared laser beam is 2% or more.

In other words, the reflectance R1 for the blue-violet laser beam in the AR coat (antireflection coat) and the reflectance R2 for the red laser beam and the infrared laser beam in the AR coat satisfy R1<(R2)/2.

Moreover, in the second embodiment, although the blue-violet laser light source 1 for emitting the blue-violet laser beam and the dual wavelength laser light source 11 for emitting the red laser beam and the infrared laser beam are provided, the present invention is not limited thereto, and it is also possible to provide the blue-violet laser light source 1 for emitting the blue-violet laser beam and a laser light source for emitting either the red laser beam or the infrared laser beam.

Third Embodiment

Figure 11:
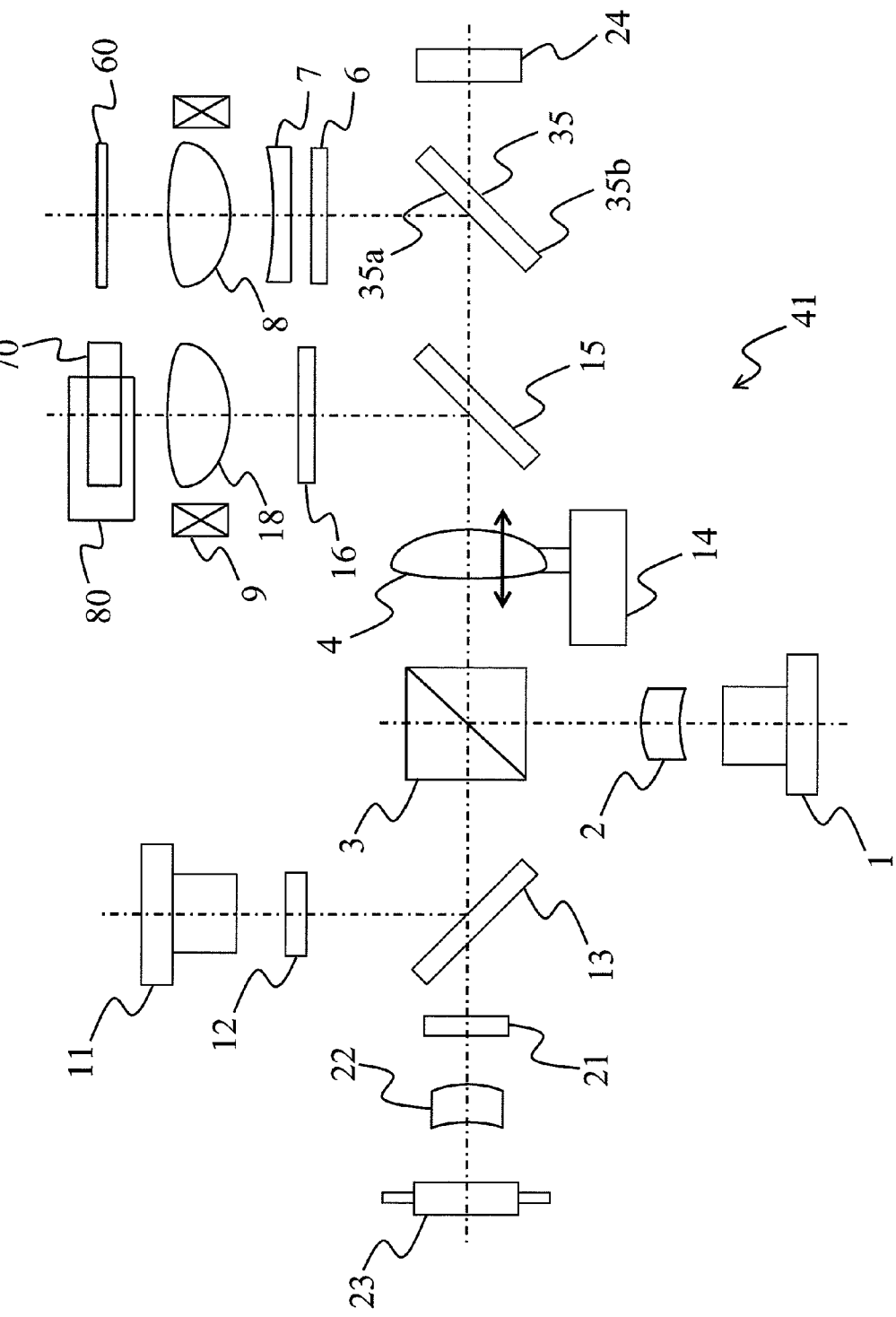
FIG. 11 is a diagram showing the schematic configuration of the optical head in the third embodiment of the present invention.

FIG. 11 is a diagram showing the schematic configuration of the optical head in the third embodiment of the present invention. In the third embodiment, the same reference numeral is given to the same constituent element that is common with the first embodiment and the second embodiment, and the explanation thereof is omitted.

The optical head 41 shown in FIG. 11 comprises a wavelength selection mirror 35 in substitute for the mirror with a diffraction grating 25 of the optical head 40 shown in FIG. 10. The wavelength selection mirror 35 mainly reflects the blue-violet laser beam that is emitted from the collimator lens 4, and bends most of the reflected part of the blue-violet laser beam in the direction of the objective lens 8. Moreover, the wavelength selection mirror 35 transmits a part of the blue-violet laser beam, most of the red laser beam, and most of the infrared laser beam, and causes the respective transmitted laser beams to enter the front monitor sensor 24. Incidentally, in the third embodiment, the wavelength selection mirror 35 corresponds to an example of the first planar optical element.

The wavelength selection mirror 35 is a planar mirror having wavelength selectivity. A reflective coat having wavelength selectivity that reflects 90% reflects and 10% transmits the blue-violet laser beam that enters at an angle of 45 deg and reflects nearly 100% of the red laser beam and the infrared laser beam is formed on the surface of the light incident side (first surface) 35a of the wavelength selection mirror 35.

Meanwhile, an AR coat having prescribed reflectance and transmittance for the blue-violet laser beam is formed on the surface of the light emission side (second surface) 35b of the wavelength selection mirror 35 in order to prevent the internal reflection of the blue-violet laser beam. Since this AR coat is optimized for the blue-violet laser beam, several % of the red laser beam and the infrared laser beam will be internally reflected. Specifically, the reflectance for the blue-violet laser beam is less than 1% and the reflectance for the red laser beam and the infrared laser beam is 2% or more. Incidentally, the first surface 35a and the second surface 35b are mutually parallel.

This kind of wavelength selection mirror 35 can be prepared by cutting a parallel plane substrate in which the foregoing reflective coat having wavelength selectivity is formed on the first surface 35a and the foregoing AR coat is formed on the second surface 35b. Accordingly, it is possible to create this extremely inexpensively in comparison to a wedge-shaped reflective mirror, a wedge-shaped beam splitter or the like.

With the wavelength selection mirror 35 of the third embodiment, the reflectance of the blue-violet laser beam in the second surface 35b is less than 1%. Specifically, the reflectance R1 for the blue-violet laser beam in the AR coat (antireflection coat) is smaller than 0.01. Thus, the quantity of light of the blue-violet laser beam that is headed toward the front monitor sensor 24 after being internally reflected at least two or more times by the wavelength selection mirror 35 will be sufficiently small.

Meanwhile, although the reflectance of the red laser beam and the infrared laser beam in the second surface 35b is 2% or higher, the reflectance of the red laser beam and the infrared laser beam in the first surface 35a is sufficiently small at less than 5%. Thus, the quantity of light of the red laser beam and the infrared laser beam that is headed toward the front monitor sensor 24 after being internally reflected at least two or more times by the wavelength selection mirror 35 will be sufficiently small.

As described above, with the optical head which detects an APC signal by transmitting a part of the blue-violet laser beam that entered the planar wavelength selection mirror 35 and causing it to enter the front monitor sensor 24, as a result of using the wavelength selection mirror 35 of the third embodiment, it is possible to inhibit the interference of the laser beam in the effective region of the front monitor sensor 24 even if the laser beam that enters the wavelength selection mirror 35 is parallel light, and it is thereby possible to obtain an APC signal that is accurately proportionate to the quantity of outgoing light of the blue-violet laser light source 1 and the dual wavelength laser light source 11.

Incidentally, as a result of applying the AR coat that is optimized for the blue-violet laser beam explained in the third embodiment to the mirror with a diffraction grating 5 and the mirror with a diffraction grating 25 described in the first embodiment and the second embodiment, it is possible to further inhibit the interference of the laser beam in the effective region of the front monitor sensor 24.

Fourth Embodiment

Figure 12:
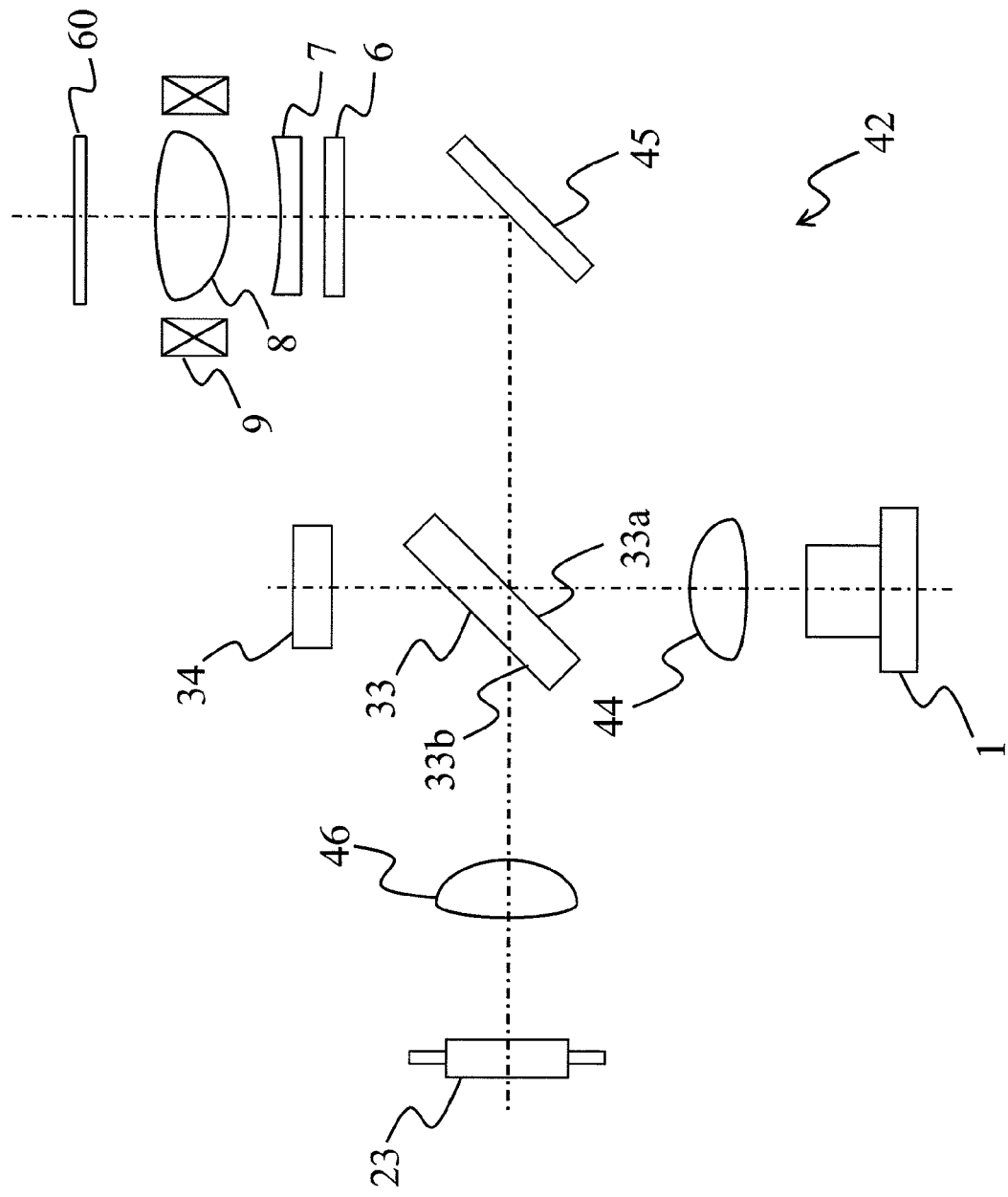
FIG. 12 is a diagram showing the schematic configuration of the optical head in the fourth embodiment of the present invention.

FIG. 12 is a diagram showing the schematic configuration of the optical head in the fourth embodiment of the present invention. In the fourth embodiment, the same reference numeral is given to the same constituent element that is common with the first embodiment, and the explanation thereof is omitted.

In FIG. 12, an optical head 42 comprises a blue-violet laser light source 1 for emitting a blue-violet laser beam, a collimator lens 44, a planar beam splitter with a diffraction grating 33, a reflective mirror 45, a quarter wavelength plate 6, a diffraction lens 7, an objective lens 8, an objective lens actuator 9, a detection lens 46, a light receiving element 23 and a front monitor sensor 34.

The operation of the optical head 42 upon recording or reproducing information to or from the multilayer optical disc 60 is now explained. The blue-violet laser beam having a wavelength of approximately 405 nm that was emitted from the blue-violet laser light source 1 is converted into approximate parallel light by the collimator lens 44, and enters the planar beam splitter with a diffraction grating 33 by S polarization. A part of the blue-violet laser beam t planar beam splitter with a diffraction grating 33 is reflected by the front monitor sensor 34 after passing through the planar beam splitter with a diffraction grating 33. Then the output of the blue-violet laser light source 1 is controlled based on the output of the front monitor sensor 34.

Meanwhile, the other part of the blue-violet laser beam that was reflected by the planar beam splitter with a diffraction grating 33 is reflected in the direction of the quarter wavelength plate 6 by the reflective mirror 45. The blue-violet laser beam that was reflected by the reflective mirror 45 is converted into circular polarized light with the quarter wavelength plate 6, and subsequently passes through the diffraction lens 7. The blue-violet laser beam that passed through the diffraction lens 7 is converged, as a light spot, on any of the information recording surfaces L0 to L3 of the multilayer optical disc 60 by the objective lens 8.

The blue-violet laser beam that was reflected by the predetermined information recording surface of the multilayer optical disc 60 passes through the objective lens 8 and the diffraction lens 7 once again, is converted into linear polarized light that is different from the outward path by the quarter wavelength plate 6, and subsequently reflected by the reflective mirror 45. The blue-violet laser beam that was reflected by the reflective mirror 45 enters the planar beam splitter with a diffraction grating 33 by P polarization. The blue-violet laser beam that passed through the planar beam splitter with a diffraction grating 33 is guided to the light receiving element 23 via the detection lens 46. The laser beam that was detected with the light receiving element 23 is subject to photoelectric conversion. The signal created by photoelectric conversion is operated with the control unit described later, and a focus error signal for following the surface fluctuation of the multilayer optical disc 60 and a tracking error signal for following the eccentricity of the multilayer optical disc 60 are created.

Incidentally, in the fourth embodiment, the blue-violet laser beam corresponds to an example of the first laser beam, the blue-violet laser light source 1 corresponds to an example of the first light source, the planar beam splitter with a diffraction grating 33 corresponds to an example of the first planar optical element, the multilayer optical disc 60 corresponds to an example of the first information recording medium, the objective lens 8 corresponds to an example of the first objective lens, the light receiving element 23 corresponds to an example of the first photodetector, and the front monitor sensor 34 corresponds to an example of the second photodetector.

The planar beam splitter with a diffraction grating in the fourth embodiment is now explained.

As shown in FIG. 12, planar beam splitter with a diffraction grating 33 of the fourth embodiment mainly reflects the blue-violet laser beam that is emitted from the collimator lens 44, and bends most of the reflected part of the blue-violet laser beam in the direction of the reflective mirror 45. Moreover, the planar beam splitter with a diffraction grating 33 transmits a part of the blue-violet laser beam, and causes such transmitted part of the blue-violet laser beam to enter the front monitor sensor 34.

A polarizing coat that reflects 90% reflects and 10% transmits the S polarization blue-violet laser beam that enters at an angle of 45 deg is formed on the surface of the light incident side (first surface) 33a of the planar beam splitter with a diffraction grating 33.

Meanwhile, a diffraction grating parallel to the entrance place of the blue-violet laser beam that enters at an angle of 45 deg is formed on the surface of the light emission side (second surface) 33b of the planar beam splitter with a diffraction grating 33. The diffraction grating splits the blue-violet laser beam that passed through the second surface 33b into zero order light and ±first order diffracted light, and splits the blue-violet laser beam that was internally reflected by the second surface 33b into zero order light and ±first order diffracted light. A general AR coat is formed on the second surface 33b for inhibiting the internal reflection. The first surface 33a and the second surface 33b are mutually parallel.

Incidentally, the diffraction grating that is formed on the second surface 33b of the planar beam splitter with a diffraction grating 33 in the fourth embodiment has the same functions and characteristics as the diffraction grating that is formed on the second surface 5b of the mirror with a diffraction grating 5 in the first embodiment.

This kind of planar beam splitter with a diffraction grating 33 can be prepared by cutting a parallel plane substrate in which the foregoing polarizing coat is formed on the first surface 33a and the foregoing diffraction grating and AR coat are formed on the second surface 33b. Accordingly, it is possible to create this inexpensively in comparison to a wedge-shaped reflective mirror, a wedge-shaped beam splitter or the like.

In the planar beam splitter with a diffraction grating 33 of the fourth embodiment, as with the mirror with a diffraction grating 5 explained in the first embodiment, the depth d of the diffraction grating that is formed on the second surface 33b is 0.08 μm. Thus, the efficiency (reflectance) of the zero order light of the blue-violet laser beam that is headed toward the front monitor sensor 34 after being internally reflected at least two or more times by the planar beam splitter with a diffraction grating 33 will be substantially zero. Moreover, the ±first order diffracted light of the blue-violet laser beam that is headed toward the front monitor sensor 34 after being internally reflected at least two or more times by the planar beam splitter with a diffraction grating 33 will be diffracted by the diffraction grating parallel to the incident plane of the laser beam that enters at an angle of 45 deg. Accordingly, the blue-violet laser beam that is headed toward the front monitor sensor 34 after being internally reflected by the planar beam splitter with a diffraction grating 33 will not be parallel to the blue-violet laser beam that is headed toward the front monitor sensor 34 after passing through the planar beam splitter with a diffraction grating 33 even if the blue-violet laser beam that enters the planar beam splitter with a diffraction grating 33 is parallel light.

As described above, with the optical head which detects an APC signal by transmitting a part of the blue-violet laser beam that entered the planar beam splitter with a diffraction grating 33 and causing it to enter the front monitor sensor 34, as a result of using the planar beam splitter with a diffraction grating 33 of the fourth embodiment, it is possible to inhibit the interference of the blue-violet laser beam in the effective region of the front monitor sensor 34 even if the blue-violet laser beam that enters the planar beam splitter with a diffraction grating 33 is parallel light, and it is thereby possible to obtain an APC signal that is accurately proportionate to the quantity of outgoing light of the blue-violet laser light source 1.

Although the foregoing first embodiment to fourth embodiment explained an optical head for recording or reproducing information to or from the multilayer optical disc 60 having four information recording surfaces L0 to L3 each having a light transmitting layer with a thickness d0 to d3 of 55 μm, 69 μm, 83 μm, and 100 μm respectively, the multilayer optical disc 60 is not limited to the foregoing structure. It goes without saying that the optical head of the first to fourth embodiments can be broadly applied to a multilayer optical disc having at least three information recording surfaces each having a light transmitting layer different in thickness; that is, a multilayer optical disc in which the space between the adjacent information recording surfaces is small in comparison to the BD which has been put into practical use.

Fifth Embodiment

Figure 13:
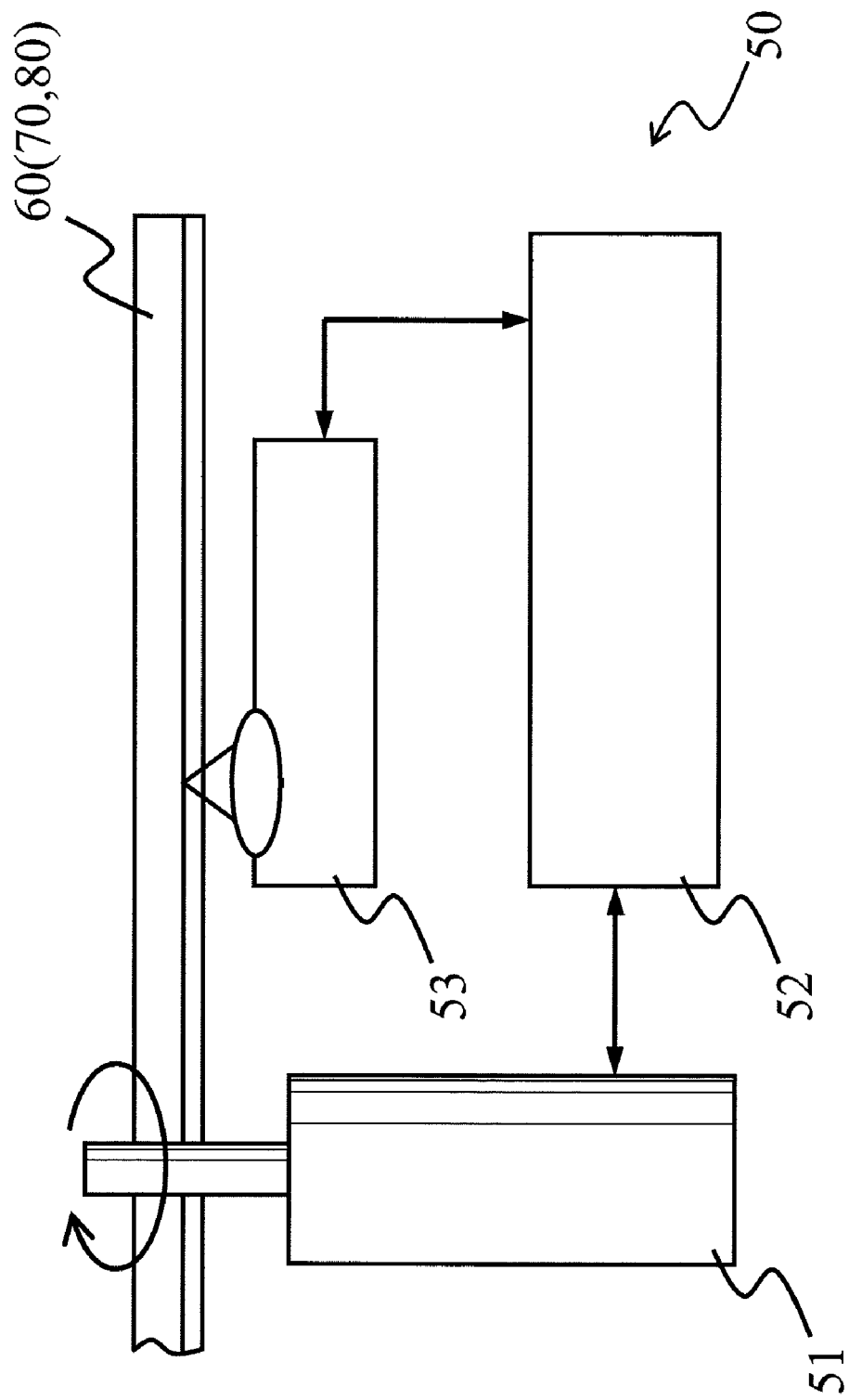
FIG. 13 is a diagram showing the schematic configuration of the optical disc device in the fifth embodiment of the present invention.

FIG. 13 is a diagram showing the schematic configuration of the optical disc device in the fifth embodiment of the present invention.

In FIG. 13, an optical disc device 50 internally comprises an optical disc drive unit 51, a control unit 52 and an optical head 53.

The optical disc drive unit 51 rotatively drives the multilayer optical disc 60 (or DVD 70 or CD 80). The optical head 53 is any one of the optical heads explained in the first embodiment to the fourth embodiment. The control unit 52 controls the drive of the optical disc drive unit 51 and the optical head 53, and performs signal processing of the control signal and the information signal that were subject to photoelectric conversion in the optical head 53. Moreover, the control unit 52 has a function of interfacing the information signal with the outside and inside of the optical disc device 50.

The control unit 52 receives the control signal obtained from the optical head 53, and performs focus control, tracking control, information reproduction control, and rotative control of the optical disc drive unit 51 based on the control signal. The control unit 52 reproduces information from the information signal and sends a recording signal to the optical head 53.

Since the optical disc device 50 is equipped with any one of the optical heads explained in the first embodiment to the fourth embodiment, the optical disc device 50 of the fifth embodiment is able to favorable record or reproduce information to or from a multilayer optical disc comprising at least three information recording surfaces.

Sixth Embodiment

Figure 14:
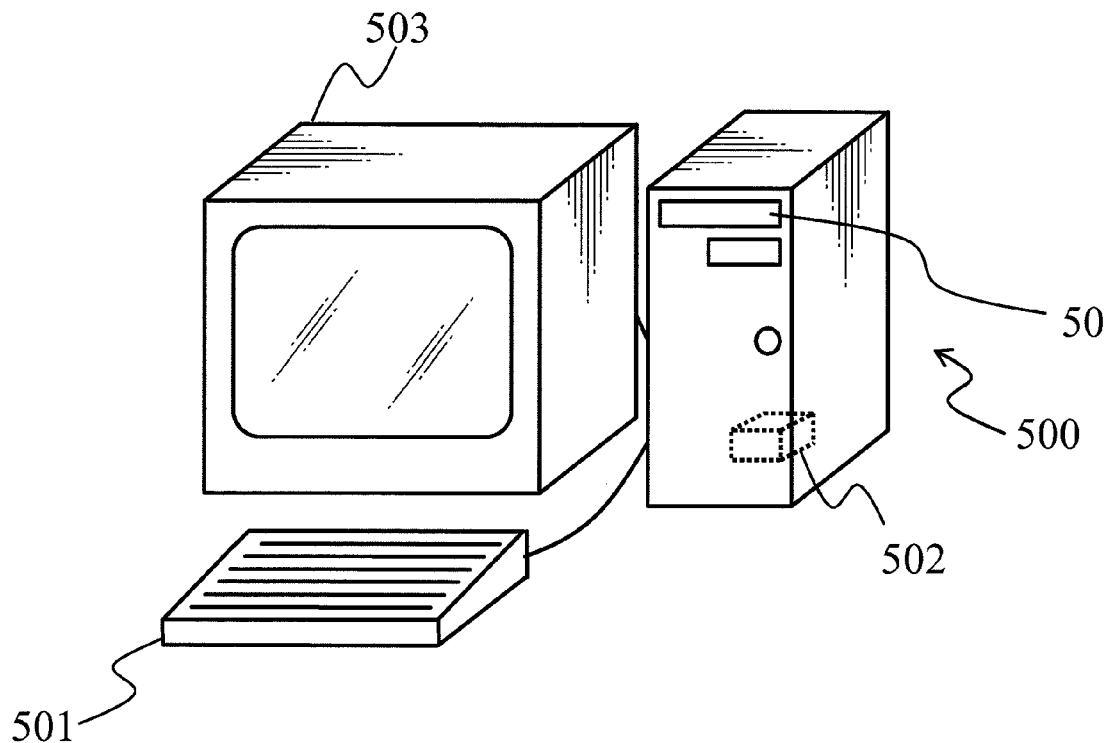
FIG. 14 is a diagram showing the schematic configuration of the computer in the sixth embodiment of the present invention.

FIG. 14 is a diagram showing the schematic configuration of the computer in the sixth embodiment of the present invention.

In FIG. 14, a computer 500 comprises the optical disc device 50 of the fifth embodiment, an input device 501 such as a keyboard, a mouse or a touch panel for inputting information, an arithmetic unit 502 such as a central processing unit (CPU) for performing arithmetic operations based on the information that was input from the input device 501 and information that was read from the optical disc device 50, and an output device 503 such as a cathode-ray tube or liquid crystal display device for displaying the results of the arithmetic operation by the arithmetic unit 502 or a printer for printing information.

Incidentally, in the sixth embodiment, the computer 500 corresponds to an example of the information processing device, and the arithmetic unit 502 corresponds to an example of the information processing unit.

Since the computer 500 comprises the optical disc device 50 of the fifth embodiment, it is possible to favorably record or reproduce information to or from a multilayer optical disc comprising at least three information recording surfaces, and can be applied to a variety of uses.

Seventh Embodiment

Figure 15:
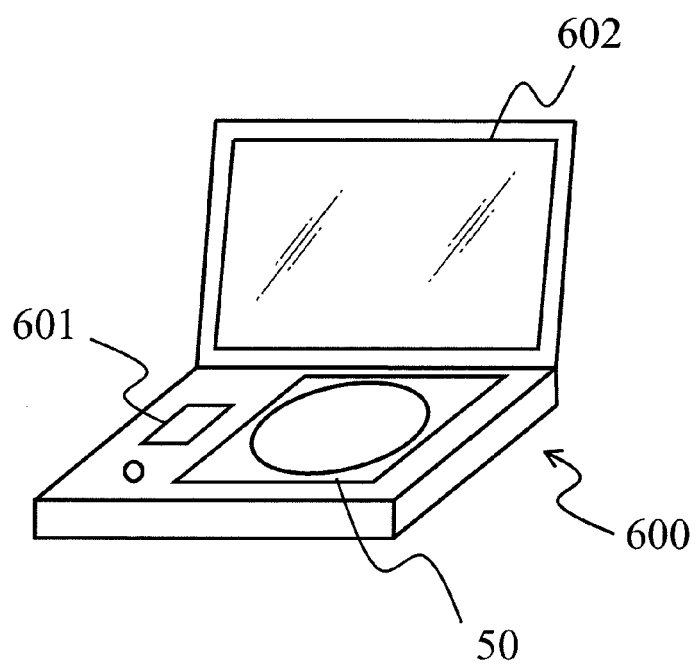
FIG. 15 is a diagram showing the schematic configuration of the optical disc player in the seventh embodiment of the present invention.

FIG. 15 is a diagram showing the schematic configuration of the optical disc player in the seventh embodiment of the present invention.

In FIG. 15, the optical disc player 600 comprises the optical disc device 50 of the fifth embodiment, and a decoder 601 for converting the information signal obtained from the optical disc device 50 into an image signal.

Incidentally, the optical disc player 600 can also be used as a car navigation system by adding a position sensor such as a GPS and a central processing unit (CPU). The optical disc player 600 further comprises a display device 602 such as a liquid crystal monitor.

Incidentally, in the seventh embodiment, the optical disc player 600 corresponds to an example of the information processing device, and the decoder 601 corresponds to an example of the information processing unit.

Since the optical disc player 600 comprises the optical disc device 50 of the fifth embodiment, it is possible to favorably record or reproduce information to or from a multilayer optical disc comprising at least three information recording surfaces, and can be applied to a variety of uses.

Eighth Embodiment

Figure 16:
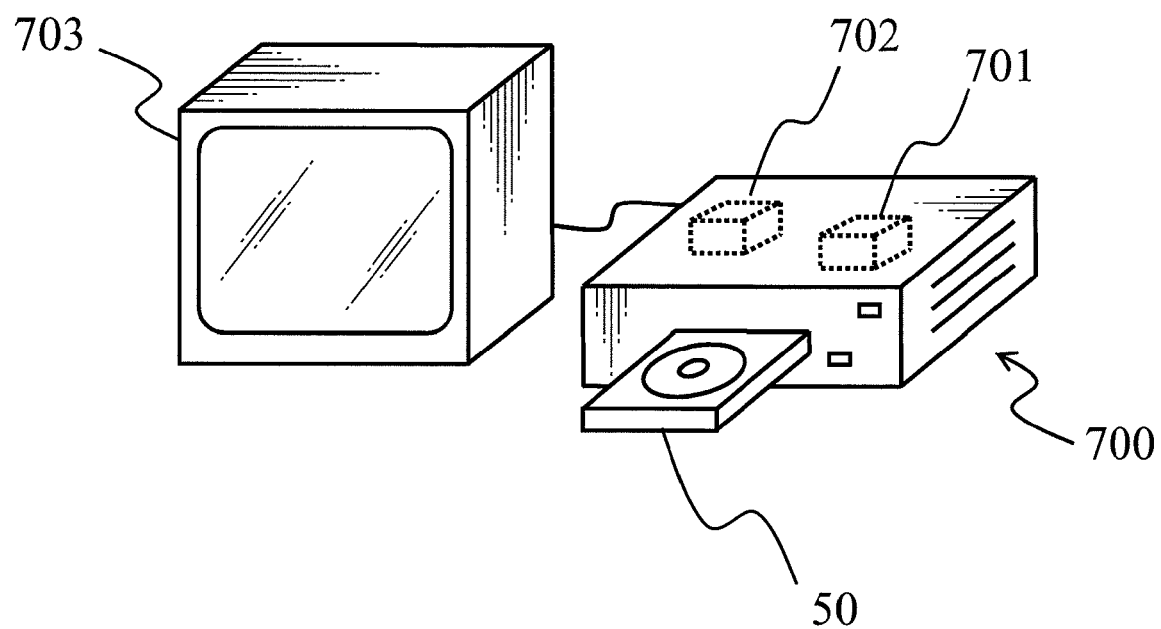
FIG. 16 is a diagram showing the schematic configuration of the optical disc recorder in the eighth embodiment of the present invention.
Figure 17:
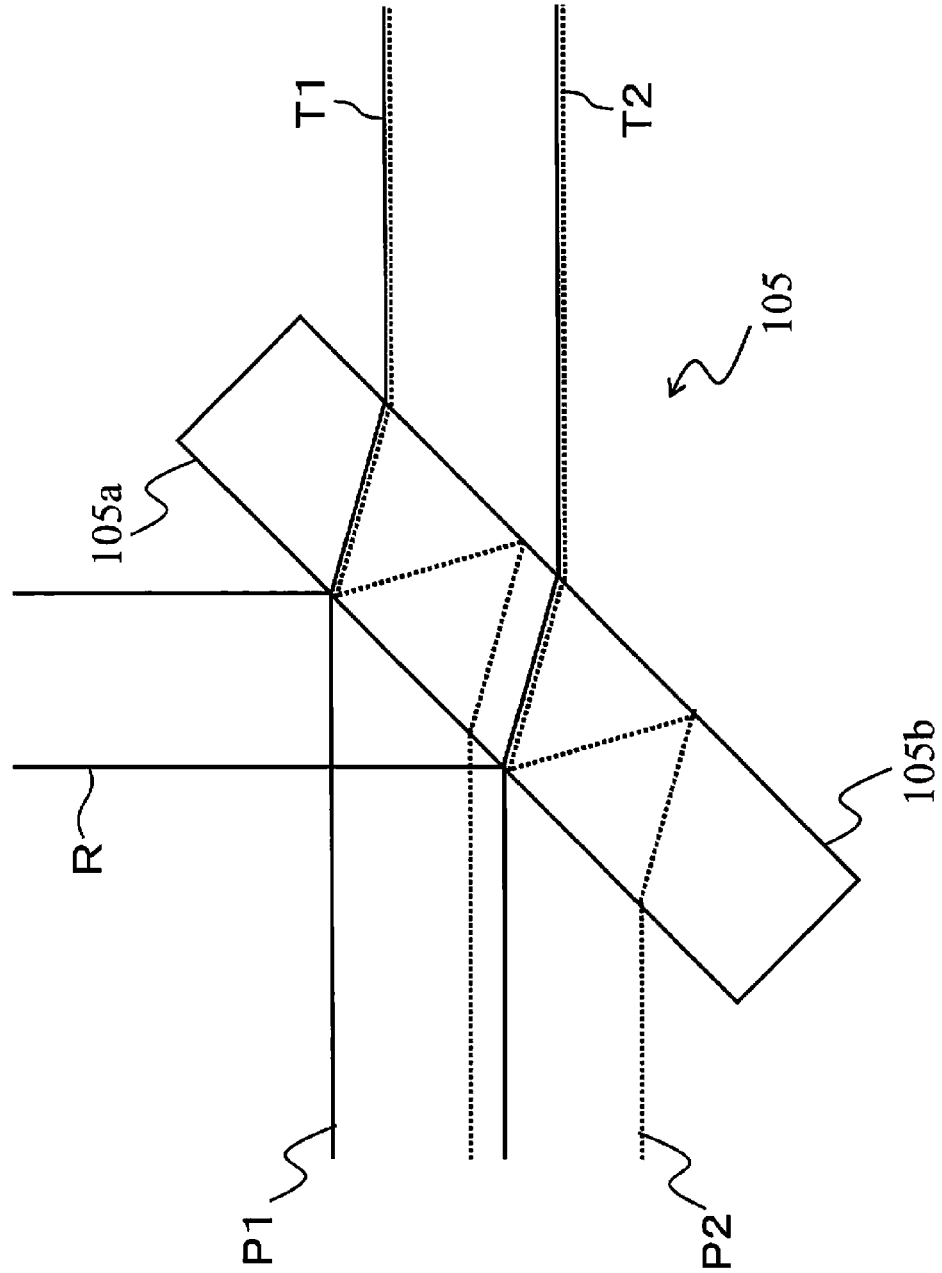
FIG. 17 is a diagram showing the condition of the transmitted light and the reflected light in a conventional planar beam splitter.
Figure 18:
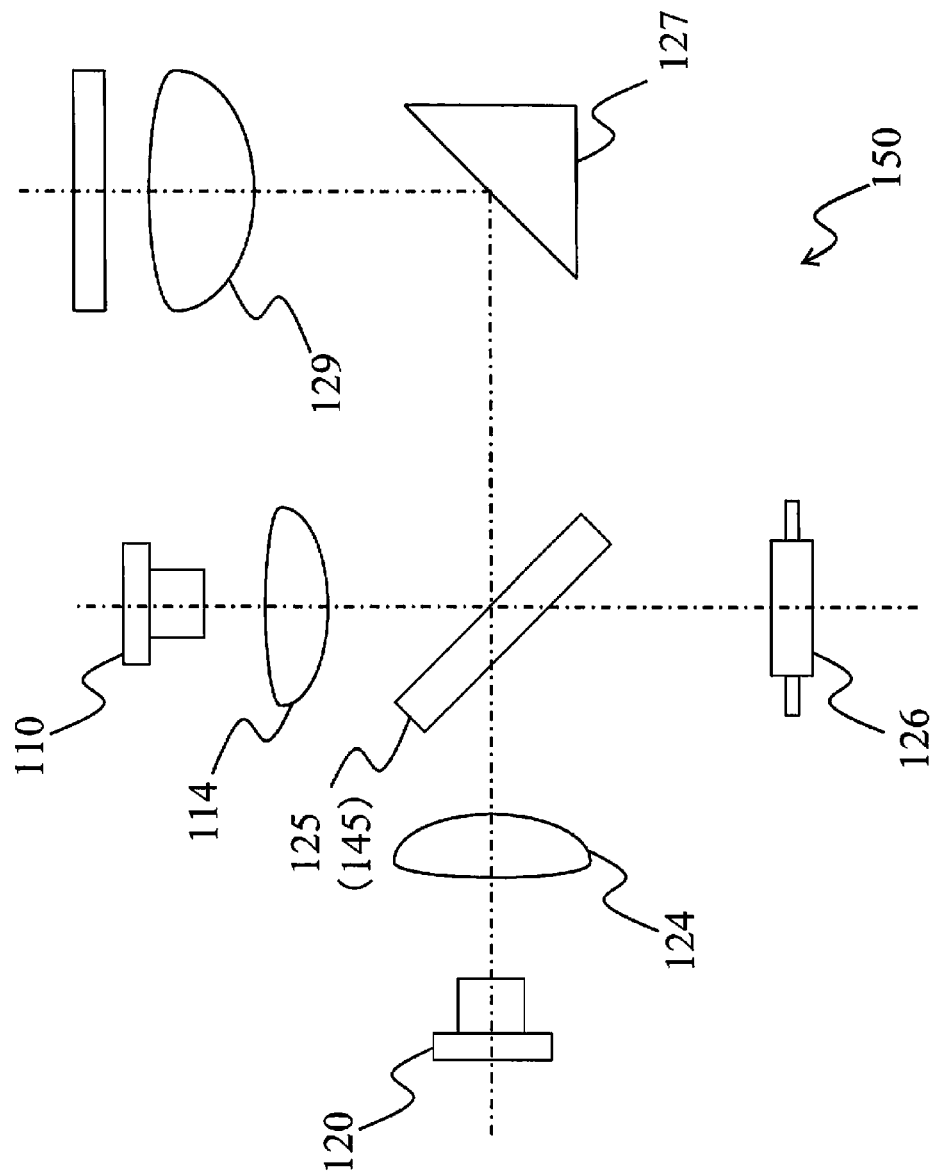
FIG. 18 is a diagram showing the schematic configuration of a conventional optical pickup.
Figure 19:
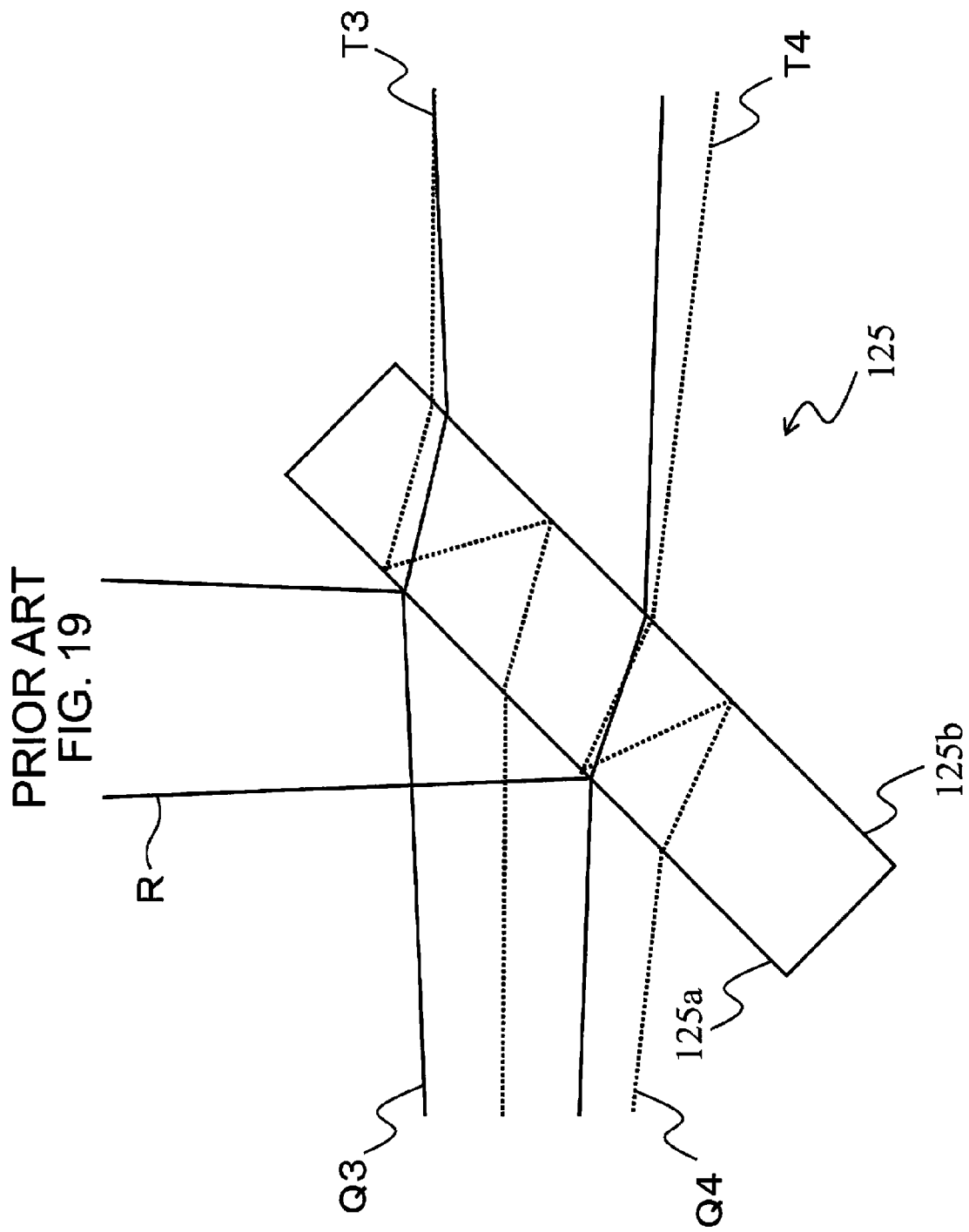
FIG. 19 is a diagram showing the condition of the transmitted light and the reflected light in the planar beam splitter of the conventional optical pickup shown in FIG. 18.
Figure 20:
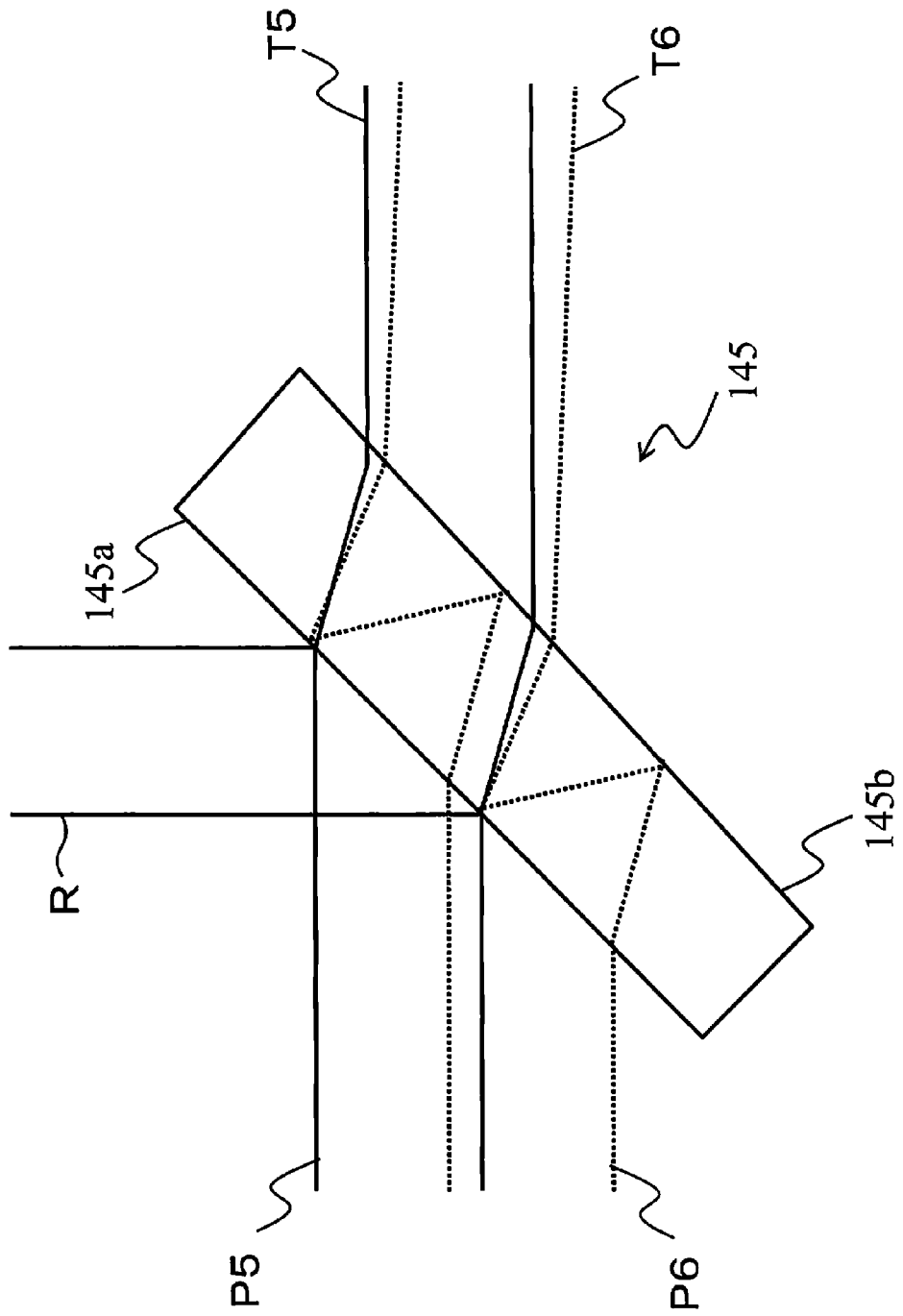
FIG. 20 is a diagram showing the condition of the transmitted light and the reflected light in a wedge-shaped beam splitter of a conventional optical pickup.

FIG. 16 is a diagram showing the schematic configuration of the optical disc recorder in the eighth embodiment of the present invention.

In FIG. 16, the optical disc recorder 700 comprises the optical disc device 50 of the fifth embodiment, and an encoder 701 for converting the image information into an information signal for recording on the optical disc by the optical disc device 50. Desirably, a decoder 702 for converting the information signal obtained from the optical disc device 50 into image information is additionally provided so as to enable the reproduction of the recorded image. The optical disc recorder 700 may also comprise an output device 703 such as a cathode-ray tube or liquid crystal display device for displaying information or a printer for printing information.

Incidentally, in the eighth embodiment, the optical disc recorder 700 corresponds to an example of the information processing device, and the encoder 701 and the decoder 702 correspond to an example of the information processing unit.

Since the optical disc recorder 700 comprises the optical disc device 50 of the fifth embodiment, it is possible to favorably record or reproduce information to or from a multilayer optical disc comprising at least three information recording surfaces, and can be applied to a variety of uses.

Incidentally, the foregoing specific embodiments primarily include the invention having the following configuration.

The optical head according to one aspect of the present invention comprises a first light source for emitting a first laser beam having a first wavelength $\lambda 1$, a first planar optical element for transmitting and reflecting the first laser beam at a predetermined ratio, a first objective lens for converging the first laser beam onto an information recording surface of a first information recording medium, a first photodetector for receiving reflected light from the information recording surface of the first information recording medium and creating an information signal and/or an error signal, and a second photodetector for receiving transmitted light or reflected light from the first planar optical element and creating an automatic power control signal for controlling an output of the first light source, wherein the first planar optical element includes a first surface which the first laser beam emitted from the first light source enters, and a second surface facing the first surface, the first surface and the second surface are mutually parallel, a reflective coat for transmitting and reflecting the first laser beam at a predetermined ratio is formed on the first surface, and a diffraction grating is formed on the second surface.

According to this configuration, the first light source emits a first laser beam having a first wavelength $\lambda 1$, and the first planar optical element transmits and reflects the first laser beam at a predetermined ratio. The first objective lens converges the first laser beam onto an information recording surface of a first information recording medium, and the first photodetector receives reflected light from the information recording surface of the first information recording medium, and creates an information signal and/or an error signal. The second photodetector receives transmitted light or reflected light from the first planar optical element, and creates an automatic power control signal for controlling the output of the first light source. The first planar optical element includes a first surface which the first laser beam emitted from the first light source enters, and a second surface facing the first surface, and the first surface and the second surface are mutually parallel. A reflective coat for transmitting and reflecting the first laser beam at a predetermined ratio is formed on the first surface, and a diffraction grating is formed on the second surface.

The first laser beam that enters the first planar optical element passes through the second surface, and is internally reflected with the second surface and the first surface and subsequently passes through the second surface. Here, the first laser beam that passed through the second surface without being internally reflected and the first laser beam that was internally reflected and passed through the second surface will be respectively diffracted with a different diffraction efficiency based on the diffraction grating.

Accordingly, even if the first laser beam that enters the first planar optical element is parallel light, the ±first order diffracted light of the first laser beam that passed through the second surface after being internally reflected by the first planar optical element will not be parallel to the first laser beam that passes through the second surface without being internally reflected by the first planar optical element. Thus, it is possible to inhibit the interference of the first laser beam in the effective region of the second photodetector for controlling the laser power of the first light source, and it is thereby possible to accurately control the laser power of the first laser beam that is emitted from the first light source.

Moreover, with the foregoing optical head, preferably, the first planar optical element includes a planar polarizing beam splitter. According to this configuration, a planar polarizing beam splitter can be used as the first planar optical element.

Moreover, with the foregoing optical head, preferably, the first planar optical element includes a planar reflective mirror for reflecting the first laser beam so that the first laser beam enters substantially perpendicularly the information recording surface of the first information recording medium. According to this configuration, the first laser beam can be reflected so that it enters substantially perpendicularly the information recording surface of the first information recording medium.

Moreover, with the foregoing optical head, preferably, the first information recording medium includes at least three information recording surfaces each having a light transmitting layer different in thickness, and the foregoing optical head further comprises a spherical aberration correction unit for correcting a spherical aberration that occurs according to the thickness of the light transmitting layer of the first information recording medium, wherein the spherical aberration correction unit causes diverging light to enter the first objective lens upon recording or reproducing information to or from an information recording surface L0 with the thickest light transmitting layer, and causes converging light to enter the first objective lens upon recording or reproducing information to or from an information recording surface Ln with the thinnest light transmitting layer.

According to this configuration, the first information recording medium includes at least three information recording surfaces each having a light transmitting layer different in thickness, and the spherical aberration correction unit corrects a spherical aberration that occurs according to the thickness of the light transmitting layer of the first information recording medium. In addition, the spherical aberration correction unit causes diverging light to enter the first objective lens upon recording or reproducing information to or from an information recording surface L0 with the thickest light transmitting layer, and causes converging light to enter the first objective lens upon recording or reproducing information to or from an information recording surface Ln with the thinnest light transmitting layer.

Accordingly, it is possible to correct the third order spherical aberration according to the thickness of the light transmitting layer of the respective information recording surfaces in the first information recording medium including at least three information recording surfaces each having a light transmitting layer different in thickness.

Moreover, with the foregoing optical head, preferably, a grating depth d of the diffraction grating satisfies $(\lambda 1)/6 \leq d \leq (\lambda 1)/4$. According to this configuration, since the depth d of the diffraction grating satisfies $(\lambda 1)/6 \leq d \leq (\lambda 1)/4$, it is possible to inhibit the diffraction efficiency of the substantially internally reflected zero order light to an appropriate level.

Moreover, preferably the foregoing optical head further comprises a second light source for emitting a second laser beam having a second wavelength $\lambda 2$ that is larger than the first wavelength $\lambda 1$, a second planar optical element for transmitting and reflecting the second laser beam at a predetermined ratio and substantially transmitting the first laser beam, and a second objective lens for converging the second laser beam onto an information recording surface of a second information recording medium of a type that is different from the first information recording medium.

According to this configuration, the second light source emits a second laser beam having a second wavelength $\lambda 2$ that is larger than the first wavelength $\lambda 1$, the second planar optical element transmits and reflects the second laser beam at a predetermined ratio and substantially transmits the first laser beam, and the second objective lens converges the second laser beam onto an information recording surface of a second information recording medium of a type that is different from the first information recording medium.

Accordingly, in addition to the first information recording medium, information can be recorded or reproduced to and from a second information recording medium of a type that is different from the first information recording medium.

Moreover, with the foregoing optical head, preferably, the spherical aberration correction unit causes diverging light or converging light to enter the second objective lens upon recording or reproducing information to or from the information recording surface of the second information recording medium.

According to this configuration, the spherical aberration correction unit causes diverging light or converging light to enter the second objective lens upon recording or reproducing information to or from the information recording surface of the second information recording medium. Accordingly, since the optical axis of the second laser beam that is headed toward the second photodetector after passing through the second planar optical element and the first planar optical element and the optical axis of the second laser beam that is headed toward the second photodetector after being internally reflected two or more times by the second planar optical element, subsequently entering the first planar optical element, and passing through the first planar optical element will not mutually be parallel, it is possible to inhibit the interference of the second laser beam in the effective region of the second photodetector.

Moreover, with the foregoing optical head, preferably, zero order light transmittance $\eta 1$ of the first laser beam in the diffraction grating is smaller than zero order light transmittance $\eta 2$ of the second laser beam in the diffraction grating.

According to this configuration, since the zero order light transmittance $\eta 1$ of the first laser beam in the diffraction grating is smaller than the zero order light transmittance $\eta 2$ of the second laser beam in the diffraction grating, it is possible to sufficiently ensure the detected quantity of light of the second laser beam in the second photodetector.

Moreover, with the foregoing optical head, preferably, reflectance of the second laser beam on the first surface is less than 5%. According to this configuration, since the reflectance of the second laser beam on the first surface is less than 5%, it is possible to sufficiently ensure the detected quantity of light of the second laser beam in the second photodetector. In addition, the quantity of light of the second laser beam that is headed toward the second photodetector after being internally reflected two or more times by the first planar optical element will become sufficiently small, and it is possible to inhibit the interference of the second laser beam in the second photodetector.

Moreover, with the foregoing optical head, preferably, an antireflection coat having prescribed reflectance and transmittance for the first laser beam is formed on the second surface. According to this configuration, since an antireflection coat having prescribed reflectance and transmittance for the first laser beam is formed on the second surface, it is possible to inhibit the first laser beam from being internally reflected by the first planar optical element.

Moreover, with the foregoing optical head, preferably, reflectance R1 for the first laser beam in the antireflection coat and reflectance R2 for the second laser beam in the antireflection coat satisfy $R1<(R2)/2$.

According to this configuration, since the reflectance R1 for the first laser beam in the antireflection coat and the reflectance R2 for the second laser beam in the antireflection coat satisfy R1<(R2)/2, it is possible to inhibit the first laser beam from being internally reflected by the first planar optical element.

Moreover, preferably, the foregoing optical head further comprises a third light source for emitting a third laser beam having a third wavelength λ3 that is larger than the second wavelength λ2, wherein the second objective lens converges the third laser beam onto an information recording surface of a third information recording medium of a type that is different from the first information recording medium and the second information recording medium, and the second planar optical element transmits and reflects the third laser beam at a predetermined ratio.

According to this configuration, the third light source emits a third laser beam having a third wavelength λ3 that is larger than the second wavelength λ2, the second objective lens converges the third laser beam onto an information recording surface of a third information recording medium of a type that is different from the first information recording medium and the second information recording medium, and the second planar optical element transmits and reflects the third laser beam at a predetermined ratio.

Accordingly, in addition to the first information recording medium and the second information recording medium, it is possible to record and reproduce information to and from a third information recording medium of a type that is different from the first information recording medium and the second information recording medium.

Moreover, with the foregoing optical head, preferably, the spherical aberration correction unit causes converging light to enter the second objective lens upon recording or reproducing information to or from the information recording surface of the second information recording medium, and causes diverging light to enter the second objective lens upon recording or reproducing information to or from the information recording surface of the third information recording medium.

According to this configuration, the spherical aberration correction unit causes converging light to enter the second objective lens upon recording or reproducing information to or from the information recording surface of the second information recording medium, and causes diverging light to enter the second objective lens upon recording or reproducing information to or from the information recording surface of the third information recording medium.

Accordingly, since the optical axis of the second laser beam or the third laser beam that is headed toward the second photodetector after passing through the second planar optical element and the first planar optical element and the optical axis of the second laser beam or the third laser beam that is headed toward the second photodetector after being internally reflected two or more times by the second planar optical element, subsequently entering the first planar optical element and passing through the first planar optical element will not mutually be parallel, it is possible to inhibit the interference of the second laser beam or the third laser beam in the effective region of the second photodetector.

Moreover, with the foregoing optical head, preferably, an antireflection coat having prescribed reflectance and transmittance for the first laser beam, the second laser beam and the third laser beam is formed on the second surface.

According to this configuration, since an antireflection coat having prescribed reflectance and transmittance for the first laser beam, the second laser beam and the third laser beam is formed on the second surface, it is possible to inhibit the first laser beam, the second laser beam and the third laser beam from being internally reflected by the first planar optical element.

Moreover, with the foregoing optical head, preferably, the diffraction grating has a concave and convex pattern in which a plurality of straight lines parallel to an incident plane of the first laser beam are aligned in parallel. According to this configuration, the first laser beam can be diffracted using a diffraction grating having a concave and convex pattern in which a plurality of straight lines parallel to an incident plane of the first laser beam are aligned in parallel.

Moreover, with the foregoing optical head, preferably, the diffraction grating has an annular concave and convex pattern around an incident light axis of the first laser beam. According to this configuration, the first laser beam can be diffracted using a diffraction grating having an annular concave and convex pattern around an incident light axis of the first laser beam.

Moreover, with the foregoing optical head, preferably, the diffraction grating is a binary diffraction grating. According to this configuration, since the diffraction grating can be formed easily with a process such as etching, it can be created inexpensively.

The optical head according to another aspect of the present invention comprises a first light source for emitting a first laser beam having a first wavelength λ1, a second light source for emitting a second laser beam having a second wavelength λ2 that is larger than the first wavelength λ1, a first planar optical element for transmitting and reflecting the first laser beam at a predetermined ratio, a second planar optical element for transmitting and reflecting the second laser beam at a predetermined ratio and substantially transmitting the first laser beam, a first objective lens for converging the first laser beam onto an information recording surface of a first information recording medium, a second objective lens for converging the second laser beam onto an information recording surface of a second information recording medium of a type that is different from the first information recording medium, a first photodetector for receiving reflected light from the information recording surface of the first information recording medium and creating an information signal and/or an error signal, and a second photodetector for receiving transmitted light or reflected light from the first planar optical element and creating an automatic power control signal for controlling an output of the first light source, wherein the first planar optical element includes a first surface which the first laser beam emitted from the first light source enters, and a second surface facing the first surface, the first surface and the second surface are mutually parallel, a reflective coat for transmitting and reflecting the first laser beam at a predetermined ratio is formed on the first surface, and an antireflection coat having prescribed reflectance and transmittance for the first laser beam is formed on the second surface.

According to this configuration, the first light source emits a first laser beam having a first wavelength λ1, and the second light source emits a second laser beam having a second wavelength λ2 that is larger than the first wavelength λ1. The first planar optical element transmits and reflects the first laser beam at a predetermined ratio, and the second planar optical element transmits and reflects the second laser beam at a predetermined ratio and substantially transmits the first laser beam. The first objective lens converges the first laser beam onto an information recording surface of a first information recording medium, and the second objective lens converges the second laser beam onto an information recording surface of a second information recording medium of a type that is different from the first information recording medium. The first photodetector receives reflected light from the information recording surface of the first information recording medium and creating an information signal and/or an error signal. The second photodetector receives transmitted light or reflected light from the first planar optical element and creates an automatic power control signal for controlling an output of the first light source. The first planar optical element includes a first surface which the first laser beam emitted from the first light source enters, and a second surface facing the first surface, and the first surface and the second surface are mutually parallel. A reflective coat for transmitting and reflecting the first laser beam at a predetermined ratio is formed on the first surface, and an antireflection coat having prescribed reflectance and transmittance for the first laser beam is formed on the second surface.

The first laser beam that entered the first planar optical element passes through the second surface. Here, since an antireflection coat is formed on the second surface, the internal reflection of the first laser beam is inhibited, and the quantity of light of the first laser beam that is headed toward the second photodetector after being internally reflected at least two or more times by the first planar optical element can be made sufficiently small.

Accordingly, even if the first laser beam that enters the first planar optical element is parallel light, since the first laser beam passes through the second surface without being substantially internally reflected by the first planar optical element, it is possible to inhibit the interference of the first laser beam in the effective region of the second photodetector for controlling the laser power of the first light source, and it is thereby possible to accurately control the laser power of the first laser beam that is emitted from the first light source.

Moreover, with the foregoing optical head, preferably, reflectance R1 for the first laser beam in the antireflection coat is smaller than 0.01.

According to this configuration, since the reflectance R1 for the first laser beam in the antireflection coat is smaller than 0.01, the quantity of light of the first laser beam that is headed toward the second photodetector after being internally reflected at least two or more times by the first planar optical element can be made sufficiently small.

The optical element with a diffraction grating according to another aspect of the present invention is an optical element with a diffraction grating for transmitting and reflecting a laser beam having a predetermined wavelength λ at a predetermined ratio, and guiding the laser beam to a photodetector that creates an automatic power control signal for controlling an output of a light source that emits the laser beam, comprising a first surface which the laser beam enters, and a second surface facing the first surface, wherein the first surface and the second surface are mutually parallel, a diffraction grating is formed on the second surface, a grating depth d of the diffraction grating satisfies $\lambda/6 \leq d \leq \lambda/4$, and a pitch p of the diffraction grating satisfies $p > \lambda$.

According to this configuration, the optical element with a diffraction grating transmits and reflects a laser beam having a predetermined wavelength λ at a predetermined ratio, and guides the laser beam to a photodetector that creates an automatic power control signal for controlling an output of a light source that emits the laser beam. The optical element with a diffraction grating comprises a first surface which the laser beam enters, and a second surface facing the first surface, wherein the first surface and the second surface are mutually parallel. A diffraction grating is formed on the second surface. A grating depth d of the diffraction grating satisfies $\lambda/6 \leq d \leq \lambda/4$, and a pitch p of the diffraction grating satisfies $p > \lambda$.

The first laser beam that enters the optical element with a diffraction grating passes through the second surface, and is internally reflected with the second surface and the first surface and subsequently passes through the second surface. Here, the first laser beam that passed through the second surface without being internally reflected and the first laser beam that was internally reflected and passed through the second surface will be respectively diffracted with a different diffraction efficiency based on the diffraction grating.

Accordingly, even if the laser beam that enters the optical element with a diffraction grating is parallel light, the laser beam that passed through the second surface after being internally reflected in the optical element with a diffraction grating will not be parallel to the laser beam that passes through the second surface without being internally reflected in the optical element with a diffraction grating. Thus, it is possible to inhibit the interference of the laser beam in the effective region of the photodetector for controlling the laser power of the light source, and it is thereby possible to accurately control the laser power of the laser beam that is emitted from the light source.

Moreover, with the foregoing optical element with a diffraction grating, preferably, a reflective coat for transmitting and reflecting the laser beam at a predetermined ratio is formed on the first surface.

According to this configuration, since a reflective coat for transmitting and reflecting the laser beam at a predetermined ratio is formed on the first surface, either the transmitted light or the reflected light can be guided to the information recording medium, and the other can be guided to the photodetector.

Moreover, with the foregoing optical element with a diffraction grating, preferably, an angle of incidence θ of the laser beam that enters the first surface is 45±10 [deg]. According to this configuration, since an angle of incidence θ of the laser beam that enters the first surface is 45±10 [deg], the laser beam can be reflected so that it enters the information recording surface of the information recording medium substantially perpendicularly on the first surface.

The optical disc device according to another aspect of the present invention comprises the optical head according to any one of the foregoing paragraphs, a motor for rotatively driving an information recording medium, and a control unit for controlling the optical head and the motor. According to this configuration, the foregoing optical head can be applied to the optical disc device.

The information processing device according to another aspect of the present invention comprises the optical disc device according to the foregoing paragraph, and an information processing unit for processing information recorded in the optical disc device and/or information reproduced from the optical disc device. According to this configuration, the optical disc device comprising the foregoing optical head can be applied to the information processing device.

The specific embodiments and examples that were described above are first and foremost for clarifying the technical contents of the present invention, and the present invention should not be narrowly interpreted by being limited such specific examples, and may be variously modified and worked within the scope of the spirit and claimed subject matter of the present invention.

The optical head, the optical disc device and the optical element with a diffraction grating according to the present invention are able to detect an APC signal with an inexpensive configuration using a planar optical element in a multilayer high density optical disc including at least three information recording surfaces, and the present invention is useful as an optical head for recording or reproducing information to or from an information recording medium such as an optical disc, an optical disc device comprising the foregoing optical head, and an optical element with a diffraction grating for guiding the transmitted light or the reflected light to a photodetector that creates an automatic power control signal for controlling an output of a light source.

In addition, the information processing device comprising the optical disc device according to the present invention is able to favorably record or reproduce information to and from a multilayer high density optical disc including at least three information recording surfaces, and can be applied to a wide variety of uses.

The invention claimed is:

1. An optical head, comprising:
a first light source for emitting a first laser beam having a first wavelength $\lambda 1$;
a second light source for emitting a second laser beam having a second wavelength $\lambda 2$ that is larger than the first wavelength $\lambda 1$;
a first planar optical element for transmitting and reflecting the first laser beam at a predetermined ratio;
a second planar optical element disposed between the second light source and the first planar optical element, for transmitting and reflecting the second laser beam at a predetermined ratio and substantially transmitting the first laser beam;
a first objective lens for converging the first laser beam reflected by the first planar optical element onto an information recording surface of a first information recording medium;
a second objective lens for converging the second laser beam reflected by the second planar optical element onto an information recording surface of a second information recording medium of a type that is different from the first information recording medium;
a first photodetector for receiving reflected light from the information recording surface of the first information recording medium and creating an information signal or an error signal; and
a second photodetector for receiving transmitted light from the first planar optical element and creating an automatic power control signal for controlling an output of the first light source,
wherein the first planar optical element includes a first surface which the first laser beam emitted from the first light source enters, and a second surface facing the first surface,
the first surface and the second surface are mutually parallel,
a reflective coat for transmitting and reflecting the first laser beam at a predetermined ratio is formed on the first surface, and
an antireflection coat having prescribed reflectance and transmittance for the first laser beam is formed on the second surface.

2. The optical head according to claim 1,
wherein the first planar optical element includes a planar reflective mirror for reflecting the first laser beam so that the first laser beam enters substantially perpendicularly the information recording surface of the first information recording medium.

3. The optical head according to claim 1,
wherein the first information recording medium includes at least three information recording surfaces each having a light transmitting layer different in thickness,
the optical head further comprises a spherical aberration correction unit for correcting a spherical aberration that occurs according to a thickness of the light transmitting layer of the first information recording medium, and
the spherical aberration correction unit causes diverging light to enter the first objective lens upon recording or reproducing information to or from an information recording surface L0 with a thickest light transmitting layer, and causes converging light to enter the first objective lens upon recording or reproducing information to or from an information recording surface Ln with a thinnest light transmitting layer.

4. The optical head according to claim 1,
wherein the first information recording medium includes at least three information recording surfaces each having a light transmitting layer different in thickness,
the optical head further comprises a spherical aberration correction unit for correcting a spherical aberration that occurs according to a thickness of the light transmitting layer of the first information recording medium, and
the spherical aberration correction unit causes diverging light or converging light to enter the second objective lens upon recording or reproducing information to or from the information recording surface of the second information recording medium.

5. The optical head according to claim 1, further comprising:
a third light source for emitting a third laser beam having a third wavelength $\lambda 3$ that is larger than the second wavelength $\lambda 2$,
wherein the second objective lens converges the third laser beam onto an information recording surface of a third information recording medium of a type that is different from the first information recording medium and the second information recording medium, and
the second planar optical element transmits and reflects the third laser beam at a predetermined ratio.

6. The optical head according to claim 5,
wherein the first information recording medium includes at least three information recording surfaces each having a light transmitting layer different in thickness,
the optical head further comprises a spherical aberration correction unit for correcting a spherical aberration that occurs according to a thickness of the light transmitting layer of the first information recording medium, and
the spherical aberration correction unit causes converging light to enter the second objective lens upon recording or reproducing information to or from the information recording surface of the second information recording medium, and causes diverging light to enter the second objective lens upon recording or reproducing information to or from the information recording surface of the third information recording medium.

7. The optical head according to claim 1,
wherein reflectance R1 for the first laser beam in the antireflection coat is smaller than 0.01.

8. An optical disc device, comprising:
the optical head according to claim 1;
a motor for rotatively driving an information recording medium; and
a control unit for controlling the optical head and the motor.

9. An information processing device, comprising:
the optical disc device according to claim 8; and
an information processing unit for processing information recorded in the optical disc device or information reproduced from the optical disc device.

10. An optical head, comprising:
a first light source for emitting a first laser beam having a first wavelength $\lambda 1$;

a first planar optical element for transmitting and reflecting the first laser beam at a predetermined ratio;

a first objective lens for converging the first laser beam onto an information recording surface of a first information recording medium;

a first photodetector for receiving reflected light from the information recording surface of the first information recording medium and creating an information signal or an error signal; and a second photodetector for receiving transmitted light from the first planar optical element and creating an automatic power control signal for controlling an output of the first light source, wherein the first planar optical element includes a first surface which the first laser beam emitted from the first light source enters, and a second surface facing the first surface, the first surface and the second surface are mutually parallel, a reflective coat for transmitting and reflecting the first laser beam at a predetermined ratio is formed on the first surface, and a diffraction grating is formed on the second surface, and wherein the first information recording medium includes at least three information recording surfaces each having a light transmitting layer different in thickness, the optical head further comprises a spherical aberration correction unit for correcting a spherical aberration that occurs according to a thickness of the light transmitting layer of the first information recording medium, and the spherical aberration correction unit causes diverging light to enter the first objective lens upon recording or reproducing information to or from an information recording surface L0 with a thickest light transmitting layer, and causes converging light to enter the first objective lens upon recording or reproducing information to or from an information recording surface Ln with a thinnest light transmitting layer, and a grating depth d of the diffraction grating satisfies:

$(\lambda1)/6 \leq d \leq (\lambda1)/4$.

11. The optical head according to claim 10, wherein the first planar optical element includes a planar polarizing beam splitter.

12. The optical head according to claim 10, wherein the first planar optical element includes a planar reflective mirror for reflecting the first laser beam so that the first laser beam enters substantially perpendicularly the information recording surface of the first information recording medium.

13. The optical head according to claim 10, wherein the diffraction grating has a concave and convex pattern in which a plurality of straight lines parallel to an incident plane of the first laser beam are aligned in parallel.

14. The optical head according to claim 13, wherein the diffraction grating is a binary diffraction grating.

15. The optical head according to claim 10, wherein the diffraction grating has an annular concave and convex pattern around an incident light axis of the first laser beam.

16. An optical head, comprising:

a first light source for emitting a first laser beam having a first wavelength $\lambda1$;

a second light source for emitting a second laser beam having a second wavelength $\lambda2$ that is larger than the first wavelength $\lambda1$;

a first planar optical element for transmitting and reflecting the first laser beam at a predetermined ratio;

a second planar optical element for transmitting and reflecting the second laser beam at a predetermined ratio and substantially transmitting the first laser beam;

a first objective lens for converging the first laser beam onto an information recording surface of a first information recording medium;

a second objective lens for converging the second laser beam onto an information recording surface of a second information recording medium of a type that is different from the first information recording medium;

a first photodetector for receiving reflected light from the information recording surface of the first information recording medium and creating an information signal or an error signal; and a second photodetector for receiving transmitted light from the first planar optical element and creating an automatic power control signal for controlling an output of the first light source, wherein the first planar optical element includes a first surface which the first laser beam emitted from the first light source enters, and a second surface facing the first surface, the first surface and the second surface are mutually parallel, a reflective coat for transmitting and reflecting the first laser beam at a predetermined ratio is formed on the first surface, and a diffraction grating is formed on the second surface.

17. The optical head according to claim 16, wherein the first information recording medium includes at least three information recording surfaces each having a light transmitting layer different in thickness, the optical head further comprises a spherical aberration correction unit for correcting a spherical aberration that occurs according to a thickness of the light transmitting layer of the first information recording medium, and the spherical aberration correction unit causes diverging light or converging light to enter the second objective lens upon recording or reproducing information to or from the information recording surface of the second information recording medium.

18. The optical head according to claim 16, wherein zero order light transmittance $\eta1$ of the first laser beam in the diffraction grating is smaller than zero order light transmittance $\eta2$ of the second laser beam in the diffraction grating.

19. The optical head according to claim 16, wherein reflectance of the second laser beam on the first surface is less than 5%.

20. The optical head according to claim 16, wherein an antireflection coat having prescribed reflectance and transmittance for the first laser beam is formed on the second surface.

21. The optical head according to claim 20, wherein reflectance R1 for the first laser beam in the antireflection coat and reflectance R2 for the second laser beam in the antireflection coat satisfy:

$R1 < (R2)/2$.

22. The optical head according to claim 16, further comprising:

a third light source for emitting a third laser beam having a third wavelength $\lambda 3$ that is larger than the second wavelength $\lambda 2$, wherein the second objective lens converges the third laser beam onto an information recording surface of a third information recording medium of a type that is different from the first information recording medium and the second information recording medium, and the second planar optical element transmits and reflects the third laser beam at a predetermined ratio.

23. The optical head according to claim 22, wherein the first information recording medium includes at least three information recording surfaces each having a light transmitting layer different in thickness, the optical head further comprises a spherical aberration correction unit for correcting a spherical aberration that occurs according to a thickness of the light transmitting layer of the first information recording medium, and the spherical aberration correction unit causes converging light to enter the second objective lens upon recording or reproducing information to or from the information recording surface of the second information recording medium, and causes diverging light to enter the second objective lens upon recording or reproducing information to or from the information recording surface of the third information recording medium.

24. The optical head according to claim 22, wherein an antireflection coat having prescribed reflectance and transmittance for the first laser beam, the second laser beam and the third laser beam is formed on the second surface.

25. An optical element with a diffraction grating for transmitting and reflecting, at a predetermined ratio, a laser beam having a predetermined wavelength $\lambda$, and guiding the laser beam to a photodetector that creates an automatic power control signal for controlling an output of a light source that emits the laser beam, the optical element comprising:

a first surface which the laser beam enters; and a second surface facing the first surface, wherein the first surface and the second surface are mutually parallel, a diffraction grating is formed on the second surface, a grating depth d of the diffraction grating satisfies:

$$\lambda/6 \leq d \leq \lambda/4, \text{ and}$$

a pitch p of the diffraction grating satisfies:

$$p > \lambda.$$

26. The optical element with a diffraction grating according to claim 25, wherein a reflective coat for transmitting and reflecting the laser beam at a predetermined ratio is formed on the first surface.

27. The optical element with a diffraction grating according to claim 25, wherein an angle of incidence $\theta$ of the laser beam that enters the first surface is 45 degrees±10 degrees.

* * * * *